US012378769B2

(12) United States Patent
Blichfeldt et al.

(10) Patent No.: US 12,378,769 B2
(45) Date of Patent: Aug. 5, 2025

(54) ROOF WINDOW COMPRISING A FRAME WITH RECEIVING STRUCTURES

(71) Applicant: VKR Holding A/S, Hørsholm (DK)

(72) Inventors: Asbjørn Skyum Blichfeldt, Odder (DK); Claus Holm, Silkeborg (DK)

(73) Assignee: VKR Holding A/S (DK)

(*) Notice: Subject to any disclaimer, the term of this patent is extended or adjusted under 35 U.S.C. 154(b) by 0 days.

(21) Appl. No.: 18/849,030

(22) PCT Filed: Mar. 31, 2023

(86) PCT No.: PCT/DK2023/050076
§ 371 (c)(1),
(2) Date: Sep. 20, 2024

(87) PCT Pub. No.: WO2023/186239
PCT Pub. Date: Oct. 5, 2023

(65) Prior Publication Data

US 2025/0109591 A1 Apr. 3, 2025

(30) Foreign Application Priority Data

Mar. 31, 2022 (DK) ........................... PA 2022 70159

(51) Int. Cl.
*E04D 13/03* (2006.01)
*E06B 3/26* (2006.01)

(52) U.S. Cl.
CPC .............. *E04D 13/031* (2013.01); *E06B 3/26* (2013.01)

(58) Field of Classification Search
CPC .............. E04D 13/031; E04D 13/0354; E04D 13/0305; E04D 13/03; E04D 13/032; E04D 13/0357; E04D 13/0351; E06B 1/08; E06B 1/18; E06B 1/30; E06B 3/26; E06B 3/2605; E06B 2003/261; E06B 2003/2615; E06B 2003/262; E06B 2003/2625
See application file for complete search history.

(56) References Cited

U.S. PATENT DOCUMENTS 4,776,141 A * 10/1988 Powell .................. E04D 13/031 52/72
4,862,657 A 9/1989 Jentoft et al.
5,044,133 A 9/1991 Sampson et al.
(Continued)

FOREIGN PATENT DOCUMENTS

CN 1488024 A 4/2004
CN 201221163 Y 4/2009
(Continued)

OTHER PUBLICATIONS

International Search Report issued in connection with International Application No. PCT/DK2023/050076.
(Continued)

*Primary Examiner* — Kyle J. Walraed-Sullivan
(74) *Attorney, Agent, or Firm* — Merek, Blackmon & Voorhees, LLC

(57) ABSTRACT

In the roof window, each frame member (22) comprises a plurality of receiving structures at an interior, exterior, inner and/or outer side. The receiving structures comprise a number of grooves (25, 26, 27, 28) to interact with auxiliary equipment in an assembled condition of the frame.

20 Claims, 30 Drawing Sheets

(56) References Cited

U.S. PATENT DOCUMENTS

| | | | | | |
|---|---|---|---|---|---|
| 5,199,234 | A * | 4/1993 | Guhl | E04D 13/0315 52/72 |
| 5,355,644 | A * | 10/1994 | Guhl | E04D 13/1415 52/200 |
| 6,295,774 | B1 | 10/2001 | Lindgren | |
| 6,578,326 | B1 * | 6/2003 | Dyrby | E04D 13/031 52/171.2 |
| 2002/0095883 | A1 * | 7/2002 | Lindgren | E04D 13/0305 52/204.5 |
| 2004/0139669 | A1 * | 7/2004 | Feucht | E04D 13/031 52/204.5 |
| 2006/0272232 | A1 | 12/2006 | Fooks | |
| 2007/0062132 | A1 * | 3/2007 | Kristensen | E04D 13/0354 52/209 |
| 2009/0031640 | A1 | 2/2009 | Elmes et al. | |
| 2015/0361712 | A1 * | 12/2015 | Eisenbarth | E06B 3/26345 49/504 |
| 2020/0224421 | A1 | 7/2020 | Allesen | |
| 2021/0198894 | A1 | 7/2021 | Jacobsen | |

FOREIGN PATENT DOCUMENTS

| | | | | |
|---|---|---|---|---|
| CN | 213015025 U | | 4/2021 | |
| CN | 112996970 A | | 6/2021 | |
| CN | 113123538 A | | 7/2021 | |
| EP | 1335016 A1 | * | 8/2003 | C11D 11/0047 |
| EP | 2182132 | | 5/2010 | |
| EP | 2204524 | | 7/2010 | |
| EP | 2221428 A1 | * | 8/2010 | E04D 13/0354 |
| EP | 2412915 A2 | * | 2/2012 | E06B 3/2605 |
| EP | 2426305 A1 | * | 3/2012 | E04D 13/0354 |
| EP | 2472026 | | 7/2012 | |
| EP | 2500486 | | 9/2012 | |
| EP | 2500487 | | 9/2012 | |
| EP | 2554761 A1 | * | 2/2013 | E04D 13/0354 |
| EP | 2568094 | | 3/2013 | |
| EP | 2674544 A1 | * | 12/2013 | E04D 13/0354 |
| EP | 2738339 | | 6/2014 | |
| EP | 2738339 A1 | * | 6/2014 | E04D 13/03 |
| EP | 2843151 A2 | * | 3/2015 | E04D 13/0354 |
| EP | 2921604 A1 | * | 9/2015 | E04D 13/0354 |
| EP | 2947219 | | 11/2015 | |
| EP | 3299536 A1 | * | 3/2018 | E04D 13/0354 |
| EP | 3333334 | | 10/2019 | |
| EP | 3779085 | | 2/2021 | |
| EP | 3795770 | | 3/2021 | |
| FR | 2700793 | | 7/1994 | |
| GB | 2586514 | | 2/2021 | |
| JP | 2019039014 | | 3/2019 | |
| WO | WO-8503543 A | * | 8/1985 | E06B 3/10 |
| WO | WO8804348 | | 6/1988 | |
| WO | WO-8804348 A | * | 6/1988 | E04B 1/49 |
| WO | WO-9822681 A1 | * | 5/1998 | E04D 13/031 |
| WO | WO2008135048 A1 | | 11/2008 | |
| WO | WO-2013050045 A1 | * | 4/2013 | E04D 13/0354 |
| WO | WO-2015022435 A1 | * | 2/2015 | E04B 1/66 |
| WO | WO2020094201 A1 | | 5/2020 | |

OTHER PUBLICATIONS

Written Opinion issued in connection with International Application No. PCT/DK2023/050076.

International Preliminary Report on Patentability issued in connection with International Application No. PCT/DK2023/050076.

U.S. Appl. No. 18/848,996, filed Sep. 20, 2024.

U.S. Appl. No. 18/848,979, filed Sep. 20, 2024.

U.S. Appl. No. 18/849,046, filed Sep. 20, 2024.

U.S. Appl. No. 18/849,069, filed Sep. 20, 2024.

English translation of Chinese Office Action dated Mar. 4, 2025 issued in connection with Chinese Patent Application No. 202380031875.5.

Chinese Office Action dated Mar. 6, 2025 issued in connection with Chinese Patent Application No. 202380031899.0.

European Search Report dated Apr. 15, 2025 issued in connection with European Patent Application No. 25153071.3.

* cited by examiner

A.-F.

ROOF WINDOW COMPRISING A FRAME WITH RECEIVING STRUCTURES

TECHNICAL FIELD

The present invention relates to a roof window comprising a frame, a sash, and a pane, in which the frame comprises a set of frame members including a top frame member, two side frame members and a bottom frame member and the sash comprises a set of sash members including a top sash member, two side sash members and a bottom sash member.

BACKGROUND ART

Roof windows to be installed in inclined roof surfaces come in a variety of types. When selecting a roof window type for a specific installation location in a building, parameters such as operability, thermal properties, weather-tightness, and suitable finishing to the interior of the building are typically given substantial weight; however, it is also often desired and in some areas in fact necessary to factor in the external appearance as well. This applies in particular when installing roof windows in conservation areas, in which building regulations may demand that the roof windows meet standard or local requirements. Thus, certain requirements apply depending on whether the installation concerns a newly fitted roof window, or to replace an existing window or rooflight as part of a renovation or refurbishment project.

The windows or rooflights of past times were typically made of cast iron with single glass pane pieces, separated by one or more cast iron glazing bars, and the thermal efficiency of these roof windows or rooflights left room for improvement. To fulfil the energy performance required by modern day building regulations, conservation roof windows are typically provided with an insulating pane, while at the same time setting out to mimic the look of traditional rooflights.

In many installation situations it is a further requirement that the conservation roof window is able to be installed with a "low profile", i.e. that the height of the parts of the roof window protruding above the surrounding roofing is as small as possible. This is particularly pronounced in buildings with substantially flat roofing materials, such as slate or shingle. To meet this requirement, most major roof window manufacturers allow installation in at least two levels, thus accommodating the height of various roofing profiles and installation conditions.

With an ever-increasing awareness of environmental considerations and the wish to reduce or even eliminate the climate footprint of products, there is furthermore a need for providing products which are more environmentally friendly in terms of manufacturing, supply, installation, and use.

Taking all of the above requirements into account, it is an ongoing quest to improve a roof window for conservation purposes.

SUMMARY OF INVENTION

With this background, it is an object of the invention to provide a roof window by which the manufacturing and assembly process is rendered more flexible.

This and further objects are achieved with a roof window of the kind mentioned in the introduction which is furthermore characterised in that each frame member comprises a plurality of receiving structures at an interior, exterior, inner and/or outer side of the respective frame member, each said receiving structure being configured to interact with auxiliary equipment in an assembled condition of the frame.

During manufacture of the roof window, auxiliary equipment such as sealing profiles, coverings, outer insulation pieces, interior lining, mounting brackets etc. are selected according to a number of parameters such as the dimensions of the roof window, requirements for thermal insulation, sound-dampening etc. The well-defined receiving structures furthermore makes it easy to place the auxiliary equipment in the correct position.

In one embodiment, at least the top frame member and the two side frame members have substantially identical cross-sections. This provides for substantial improvements in terms of manufacture, storage and assembly.

The bottom frame member may comprise an outer piece and a separate inner piece, which are manufacture according to specifications and subsequently joined, for instance by a mortise or dovetail joint.

In a presently preferred embodiment, a first receiving structure comprises a lining groove in an interior side of each frame member, the lining grooves being configured to interact with a set of interior lining panels. This facilitates not only installation but also refurbishment of either the window or the lining panel.

In combination with an embodiment in which the bottom frame member comprises separate pieces, a first groove portion may be provided in the outer piece and a second groove portion in the separate inner piece, the first and second groove portions forming said lining groove in the assembled condition of the frame. This emphasises the flexibility achieved in manufacture and assembly.

In a particularly advantageous embodiment, a third receiving structure comprises a first outer groove in an outer side of the frame member, and said first outer groove is configured to interact with engagement means of a mounting bracket and/or with a protrusion of an insulating frame. In this way, the first outer groove functions as a multi-purpose groove.

In another embodiment, a sixth receiving structure comprises a second outer groove in an outer side of at least the side frame members, configured to interact with engagement means of a mounting bracket.

The latter embodiment is particularly advantageous in combination with a further development, in which the engagement means of the mounting bracket engage with the second outer groove, specifically also with the first outer groove.

Other presently preferred embodiments and further advantages will be apparent from the subsequent detailed description and drawings.

A feature described in relation to one of the aspects may also be incorporated in the other aspect, and the advantage of the feature is applicable to all aspects in which it is incorporated.

BRIEF DESCRIPTION OF DRAWINGS

In the following description embodiments of the invention will be described with reference to the drawings, in which.

DESCRIPTION OF EMBODIMENTS

Figure 1:
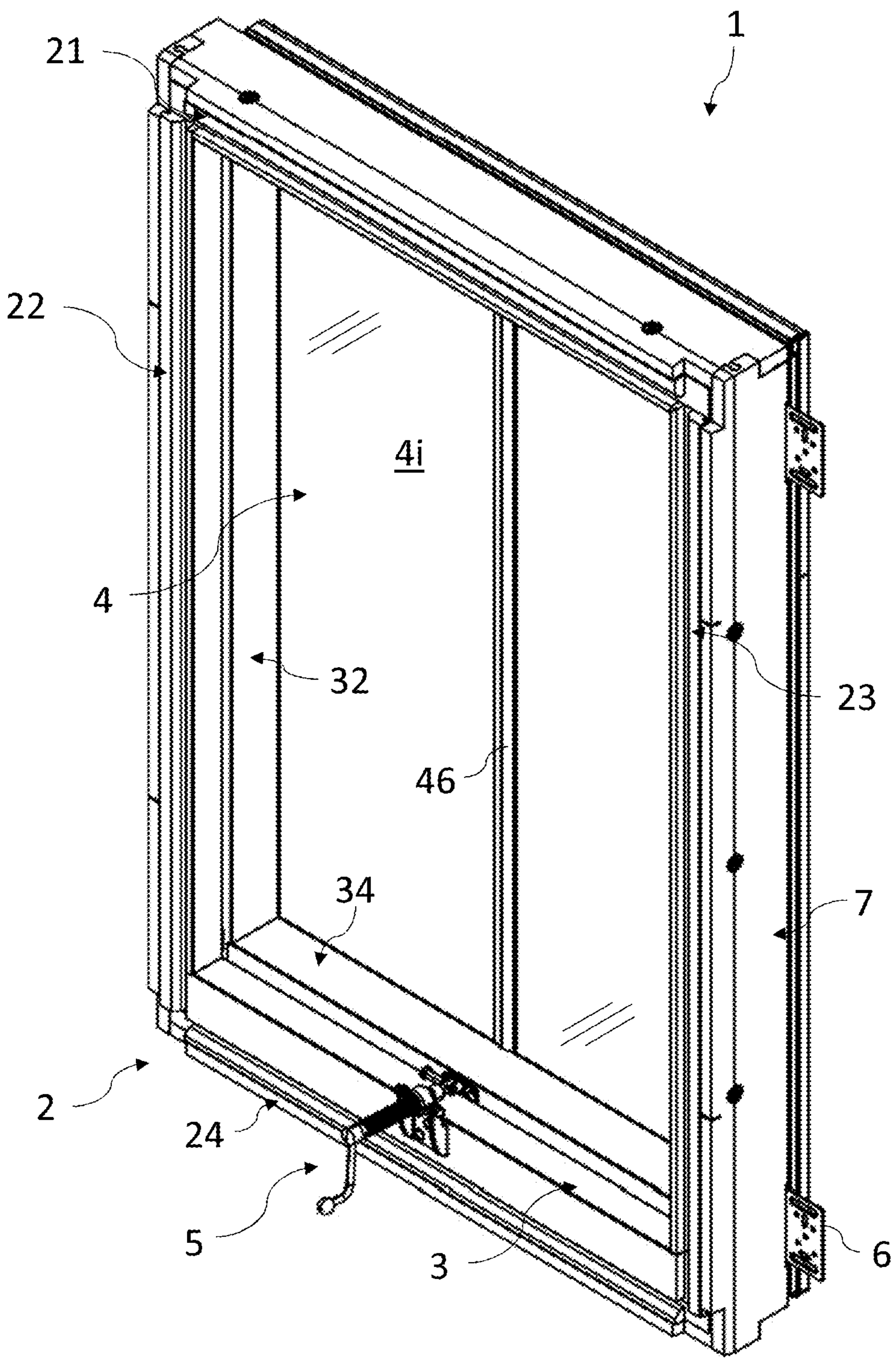
FIG. 1 is a perspective view of a roof window in an embodiment of the invention, seen from an interior side.

In the following detailed description, a preferred embodiment of the present invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations.

It is noted that terms such as “up”, “down”, “left-hand”, “right-hand”, “exterior”, “interior”, “outer”, “inner” are relative and refers to the viewpoint in question. In general, when referred to an exterior side, this relates to a side of a roof window in the mounted condition facing the outdoors or external side of the building. Conversely, an interior side refers to a side facing the internal side of the building, i.e. typically a subjacent room including any light shaft. Terms such as “outwards” and “inwards” are directions generally perpendicular to an interior-exterior direction, taking as its base point a centre of the roof window.

Figure 2:
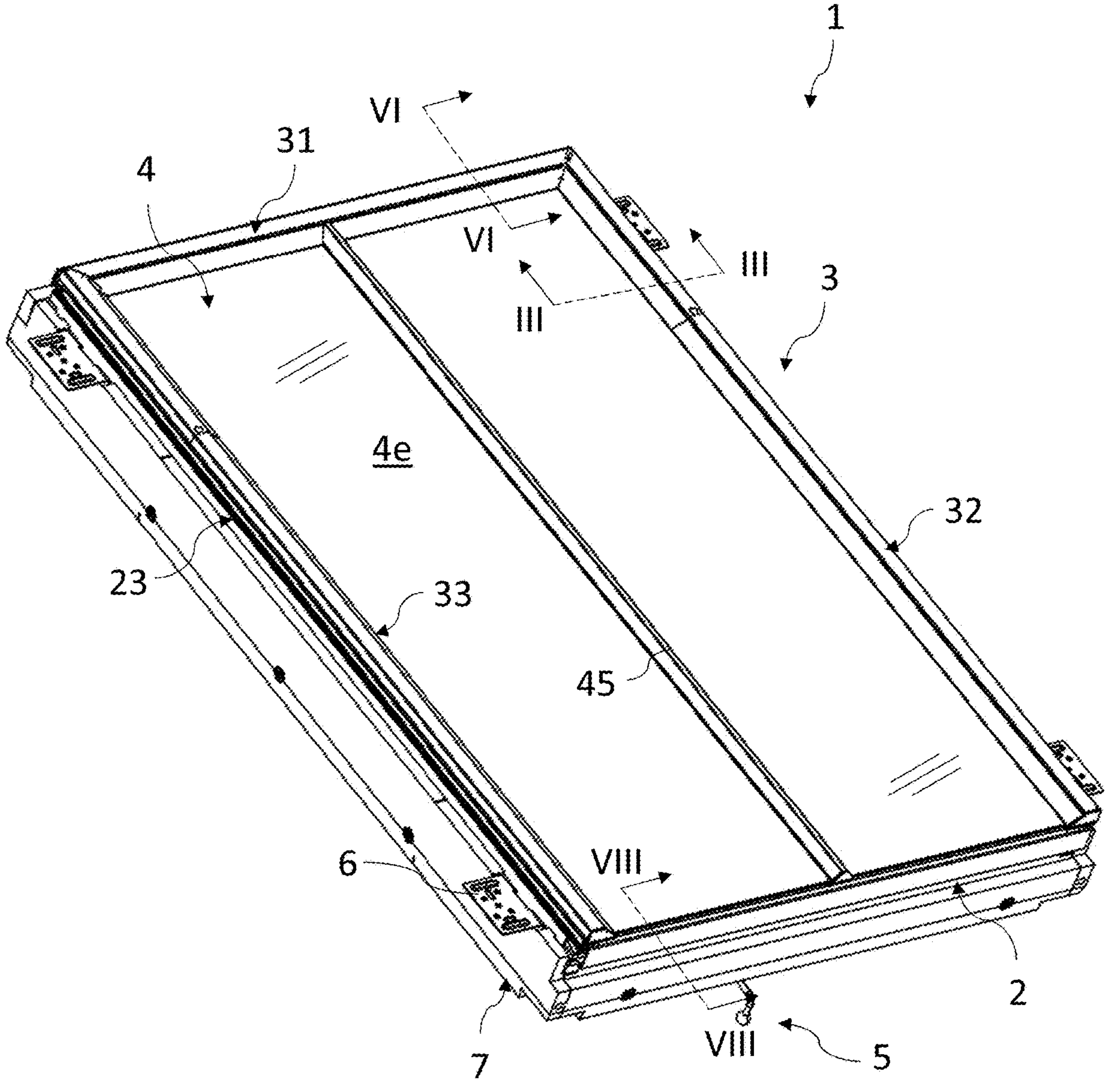
FIG. 2 is a perspective view of the roof window of FIG. 1, seen from an exterior side.

General Description of a Roof Window—FIGS. 1 and 2

Referring initially to FIGS. 1 and 2, a roof window 1 is shown. The roof window 1 is intended to be installed in an inclined roof surface (not shown).

The roof window 1 comprises a frame 2, a sash 3, and a pane 4. The frame 2 comprises a set of frame members including a top frame member 21, two side frame members 22, 23 and a bottom frame member 24.

Correspondingly, the sash 3 comprises a set of sash members including a top sash member 31, two side sash members 32, 33 and a bottom sash member 34. While the frame 2 and sash 3 are described as rectangular structures, some principles of the presented concepts may be applicable to other geometrical shapes as well.

The pane 4 comprises a number of edge portions generally associated to members of the sash 3 as will be described in further detail below. When in a closed position, an exterior pane surface 4*e* defines a plane of the roof window 1 in an assembled condition of the roof window 1. The assembled condition of the roof window 1 is achieved when main components of the frame 2 and sash 3 have been assembled and the frame 2 and sash 3 are connected to each other, for instance in an installed position when the roof window 1 is ready for use. Correspondingly, an assembled condition of the sash 3 is achieved once main components of the sash 3 have been assembled, and an assembled condition of the frame 2 when main components of the frame 2 are assembled.

An interior pane surface 4*i* faces the interior, typically a room of a building subjacent the roof surface in which the roof window 1 is installed. A glazing bar 45 is fitted to the exterior pane surface 4*e*, and a glazing bar cover 46 is fitted on the interior pane surface 4*i*. Although less practical, it would also be possible to have a two-part pane with two pane halves divided by a throughgoing glazing bar. In wide roof windows, it is also possible to have more than one glazing bar, for instance two glazing bars dividing the surface of the pane visible from the exterior into three sections.

In the embodiments shown, the sash 3 is openable relative to the frame 2, to obtain one or more open positions. In such open positions, the sash 3 and pane 4 are moved out of the plane of the roof window 1. As will be described in the following, the sash 3 is shown as being tophung, i.e. during normal use, the sash 3 is rotated about a substantially horizontal hinge axis at or near the top frame member 21 and top sash member 31. It is however conceivable to apply some principles of the presented concepts for roof windows on different types of windows having other opening patterns, or being provided as fixed skylights.

Further details shown in FIGS. 1 and 2 include an operating assembly 5, here shown as a manual handwinder or screwjack. Other operating assemblies may be present as well.

Also shown is a representative mounting bracket 6 forming part of a plurality of mounting brackets forming a load-transferring connection between the roof window 1 and a surrounding roof structure (not shown). Such a roof structure may include rafters and battens, plywood or other construction materials.

Finally, an insulating frame 7 is shown. Insulation by an insulating frame is optional and may be provided along only some of the frame members or as shown surrounding all four frame members 21, 22, 23, 24.

In the following description of various embodiments, elements having the same or analogous function carry the same reference numerals throughout. Suitable variations and modifications will be apparent to the person skilled in the art.

Figure 3:
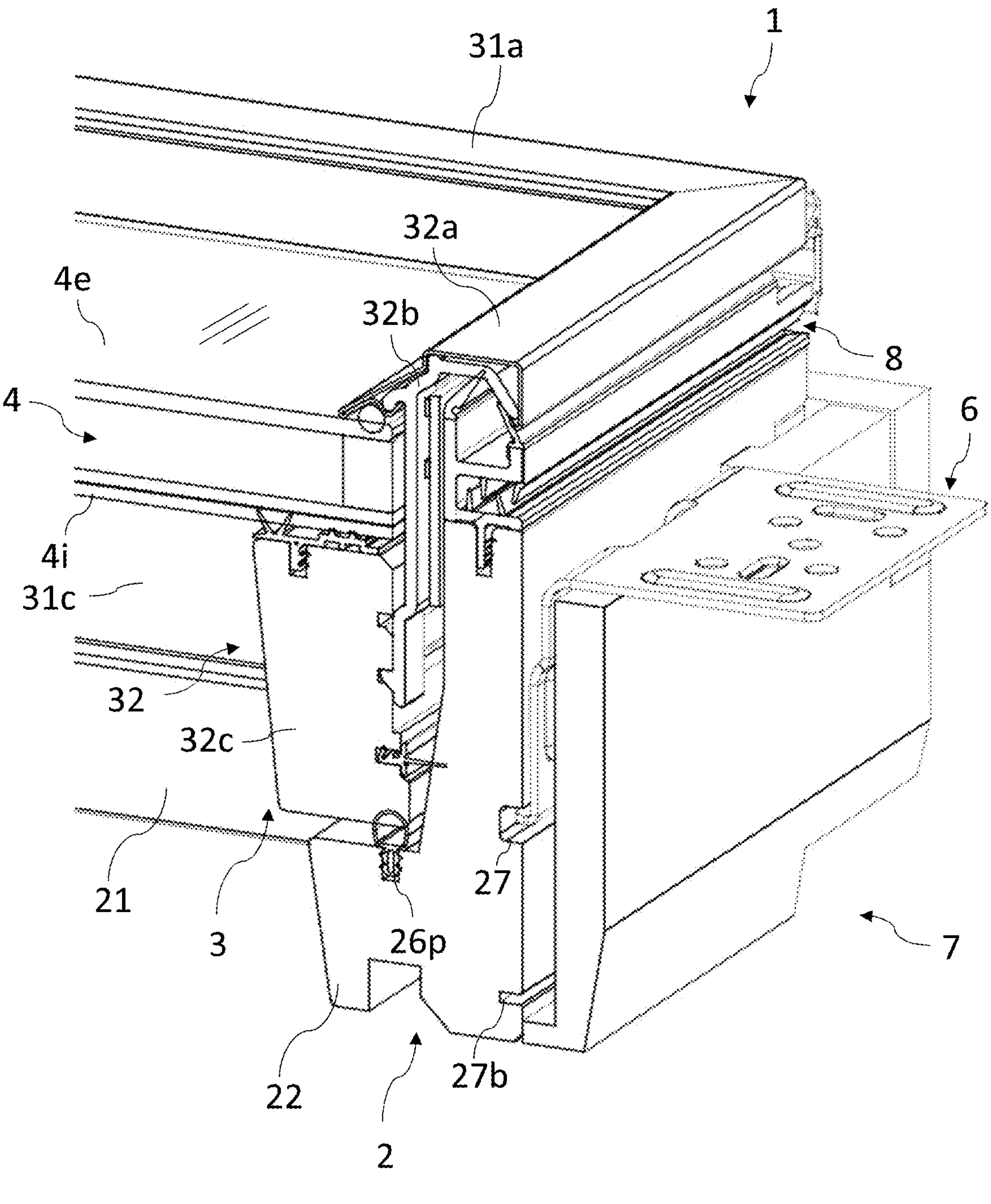
FIG. 3 is a perspective cross-sectional view of a side of a roof window in another embodiment, with a mounting bracket, corresponding to a cross-section along the line III-III in FIG. 2.
Figure 4:
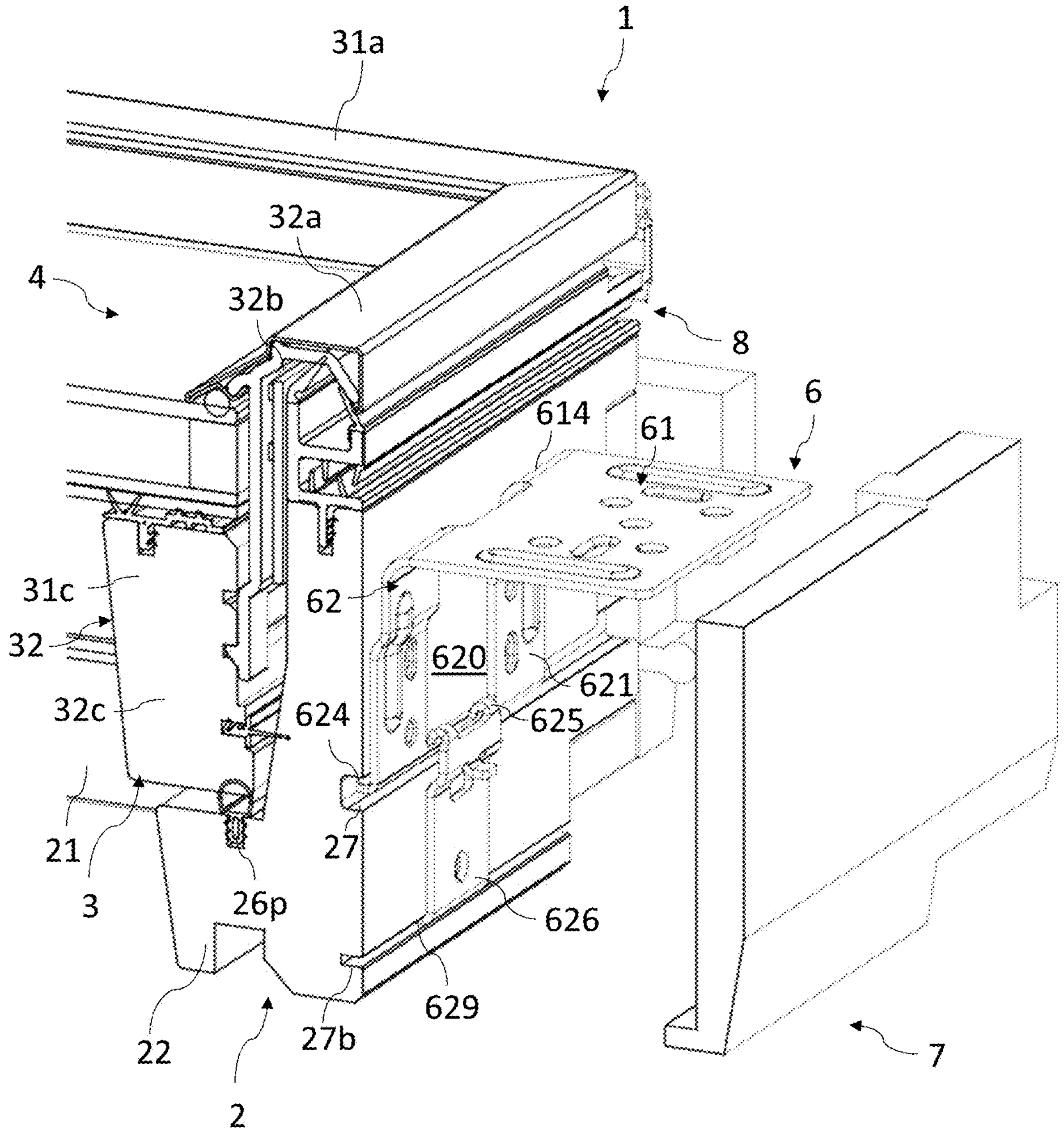
FIG. 4 is a view corresponding to FIG. 3, with an insulating frame piece shown exploded.

Mounting Bracket and Roof Window with Set of Mounting Brackets—FIGS. 3 to 4

Typically, a roof window such as the roof window 1 shown in FIGS. 1 and 2 is supplied with a set of mounting brackets 6. As indicated, two mounting brackets 6 are fastened to each side frame member 22, 23. In the following, a single mounting bracket 6 will be described, in association with one side frame member 22. The mounting brackets 6 of the set will most often be identical, although variations are possible.

The mounting bracket 6 comprises a first bracket leg 61 for fastening to the roof structure and a second bracket leg 62 for fastening to the frame 2 of the roof window 1. To that end, the second bracket leg 62 comprises engagement means to interact with a corresponding receiving structure in an outer side of the side frame member 22 of the frame 2 of the roof window 1. This ensures that the mounting bracket 6 is positioned correctly on the side frame member 22 and facilitates the installation process. The positioning of the mounting bracket 6 may be indicated in both the longitudinal direction and the height direction of the side frame member 22, for instance by suitable markings and/or holes.

The first bracket leg 61 of the mounting bracket 6 is connected to the second bracket leg 62 via a bend 614.

In the embodiment shown, the second bracket leg 62 is provided with a first engagement means 624 in a first section 621 of the second bracket leg 62 and a second engagement means 629 in a second section 626 of the second bracket leg 62.

Of these two engagement means 624, 629, the second engagement means 629 is configured to assume an inactive position and an active position, of which the active position is shown.

The first engagement means 624 is configured to be received in one receiving structure of the outer side of the frame member 22 in the mounted condition of the mounting bracket 6 on the frame 2 of the roof window 1, and the second engagement means 629 is configured to be received in another receiving structure of the outer side of the frame member 22 in the mounted condition of the mounting bracket 6 on the frame 2 of the roof window 1 in its active position only. This is shown most clearly in FIG. 4, in which the first engagement means 624 is received in a first outer groove 27, and the second engagement means 629 is received in a second outer groove 27*b*. At least the side frame members 22, 23 each comprises a plurality of receiving structures at an outer side of the respective side frame member, such that at least one of the receiving structures interacts with the mounting bracket 6 in the mounted condition of the roof window 1. The first outer groove 27 and the second outer groove 27*b* both extend in the longitudinal direction of the side frame member 22 at a distance from each other in the height direction, the first outer groove 27 being located to the exterior of the second outer groove 27*b*, as seen in the height direction.

To bring the second section 626 with the second engagement means 629 from the position in an aperture 620 in the second bracket leg 62 to a position in which the second section 626 is located substantially in extension of the first section 621, the second section 626 with the second engagement means 629 is connected to the first section 621 via a hinge connection 625, such that the second section 626 is configured to be brought from the inactive position to the active position by rotating the second section 626.

In the embodiment shown, each of the first and second engagement means comprises a flange 624, 629 protruding at substantially right angles from the respective first and second sections 621, 626. Alternative configurations such as discrete spikes are also conceivable.

Hinge Assembly and Coupling Unit—FIGS. 6 to 7 and 22 and 23

Figure 6:
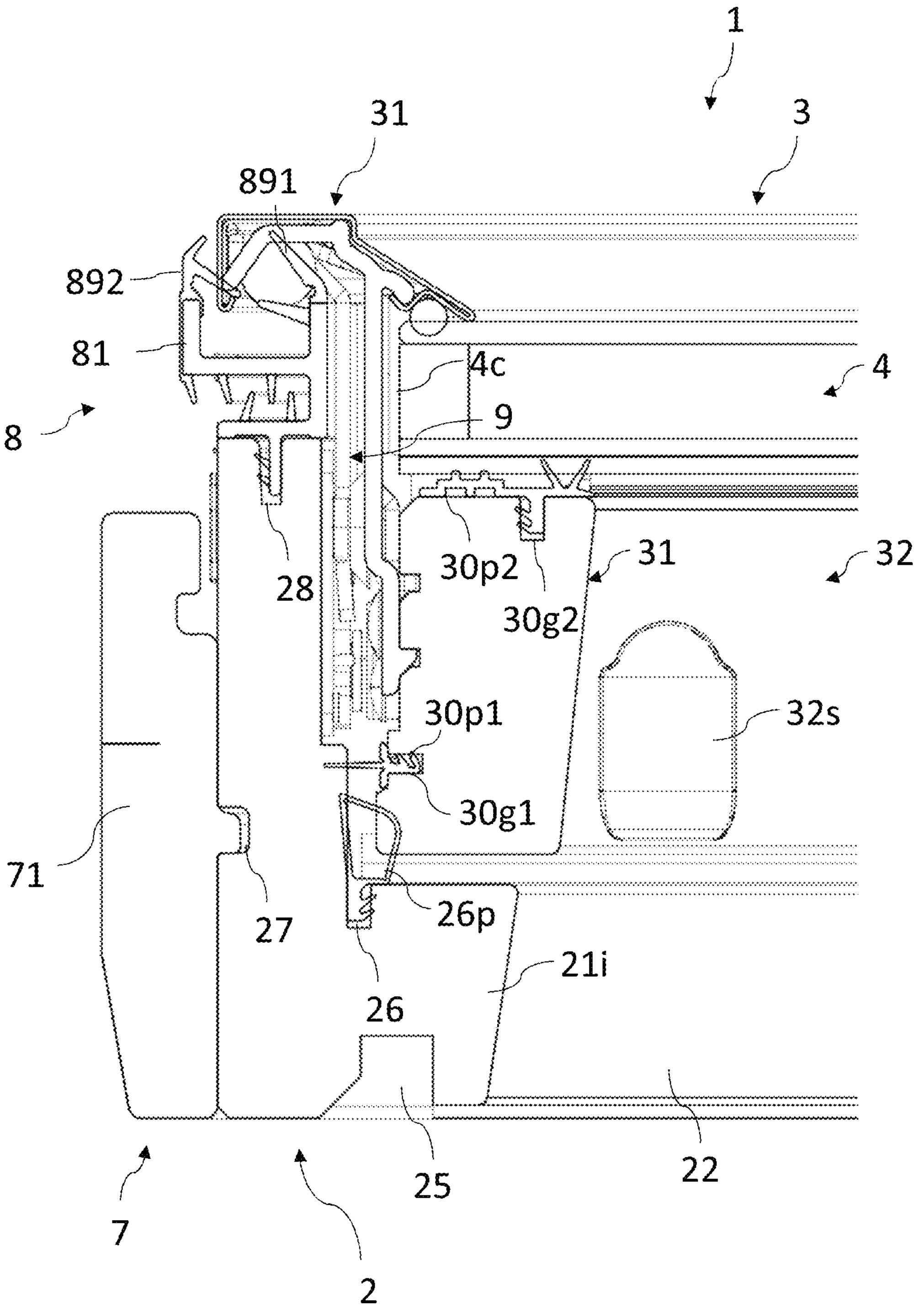
FIG. 6 is a cross-sectional view of a roof window in a further embodiment, corresponding to a cross-section along the line VI-VI in FIG. 2.
Figure 7:
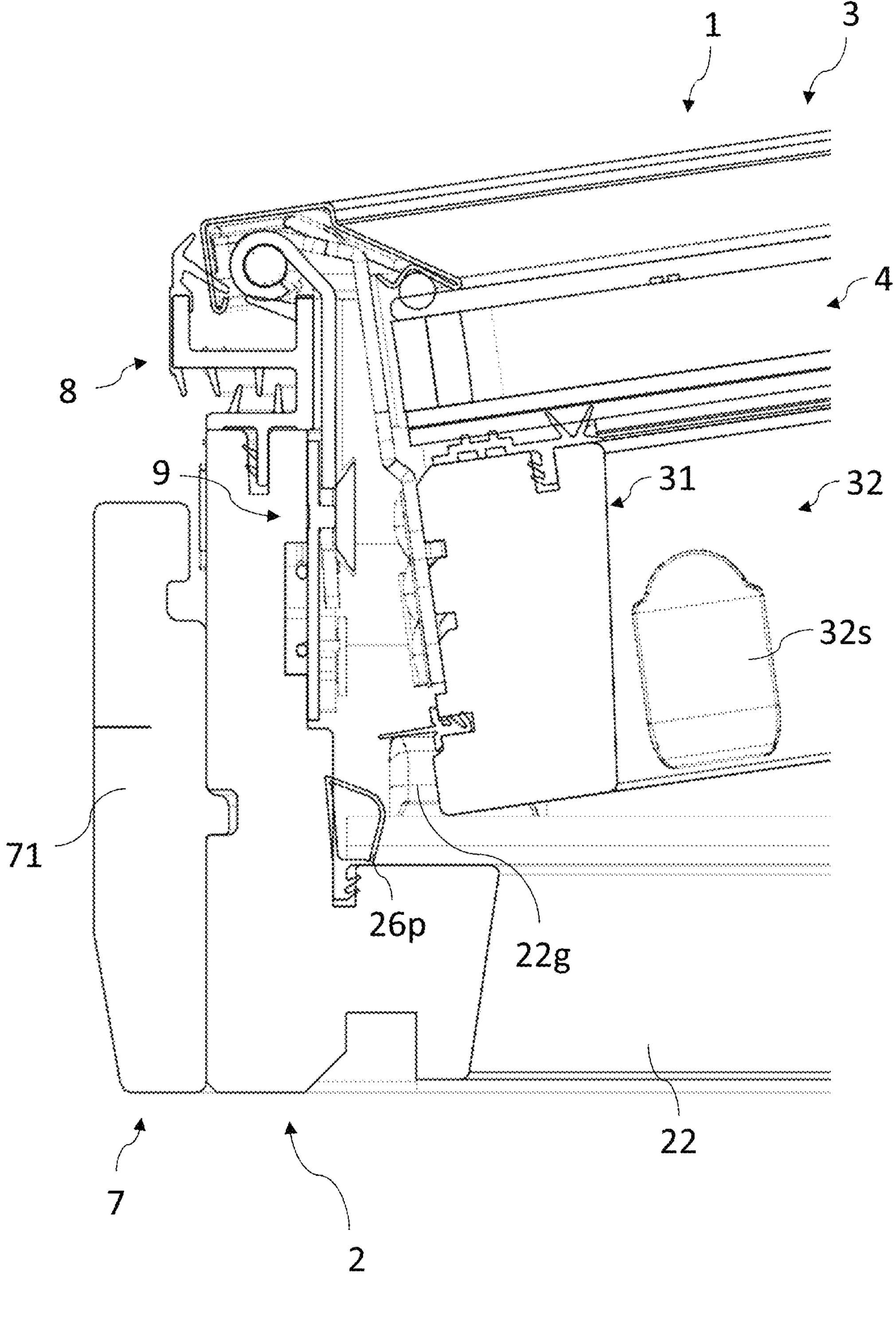
FIG. 7 is a view corresponding to FIG. 6, with the sash in an open position.

Referring first to FIGS. 6 and 7 it is shown that the roof window 1 furthermore comprises a hinge assembly 9.

The hinge assembly 9 is configured in such a way that it allows the sash 3 to be tophung in a first operational condition corresponding to normal use. That is, during normal use the sash 3 is rotated about a substantially horizontal first hinge axis at or near the top frame member 21 and top sash member 31 between a closed position and an open position.

Figure 22:
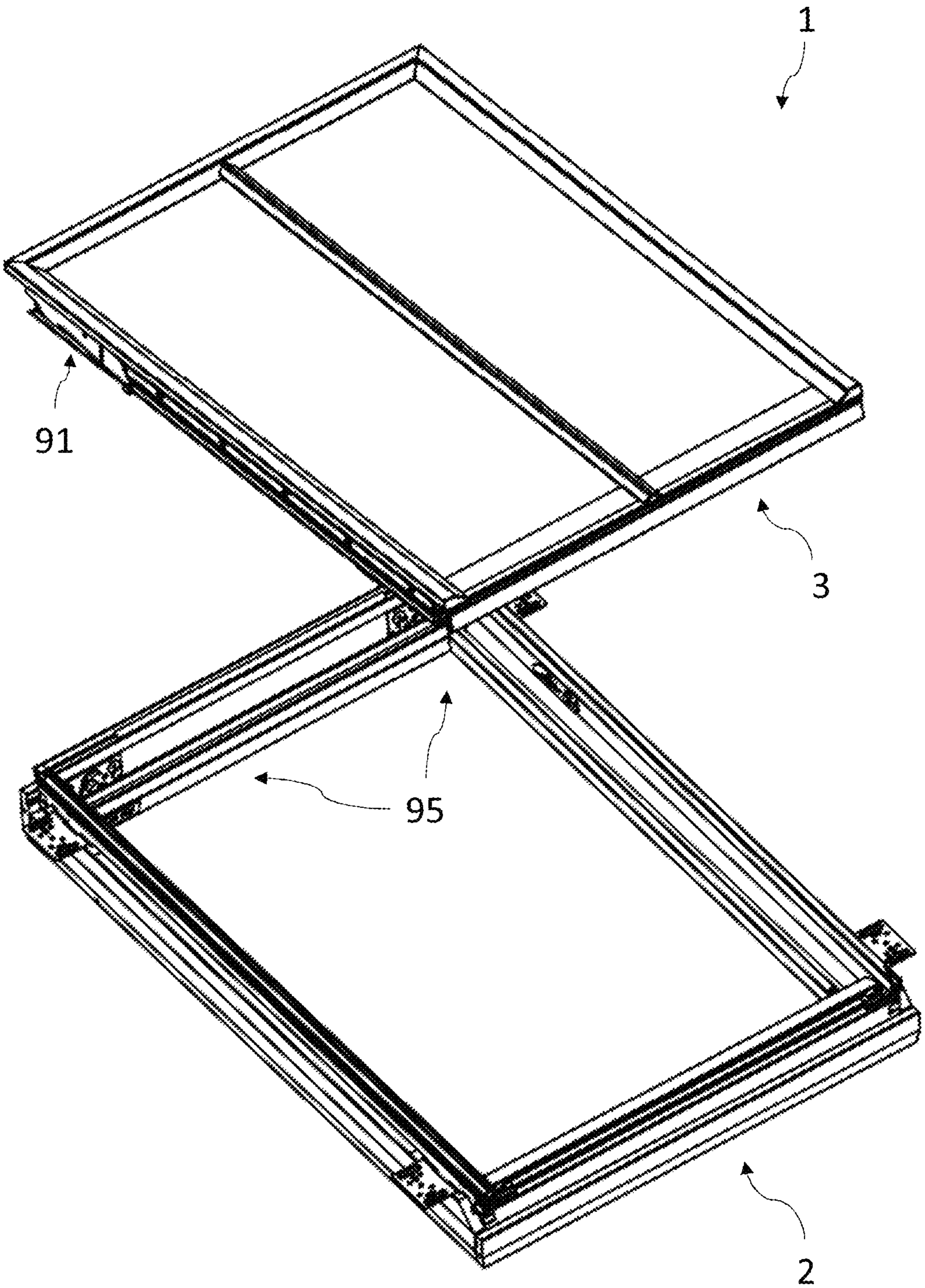
FIG. 22 is an exploded perspective view of a sash and a frame of a roof window in an embodiment incorporating a hinge assembly.
Figure 23:
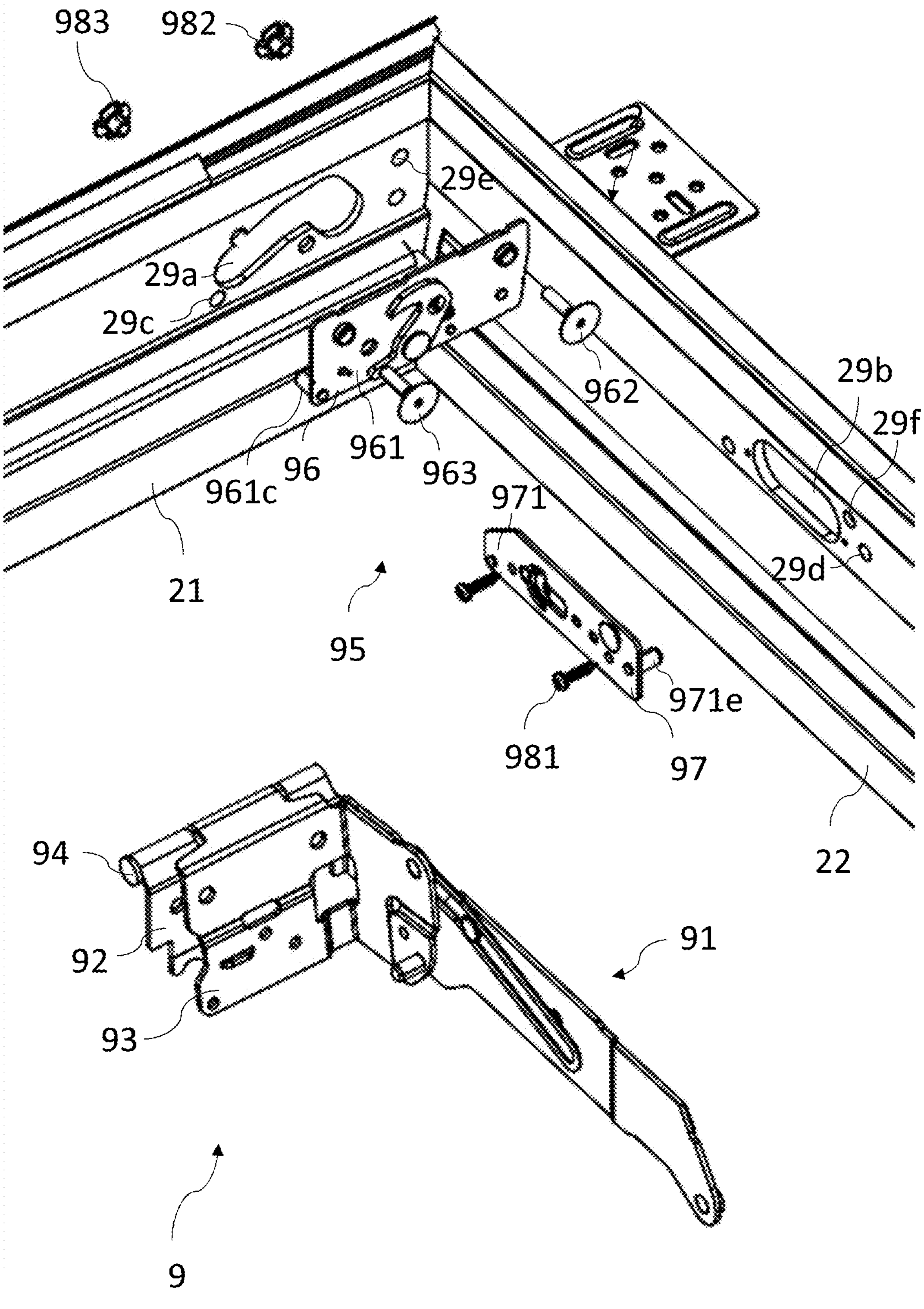
FIG. 23 is a partial perspective view of details of the roof window of FIG. 22.
Figure 24:
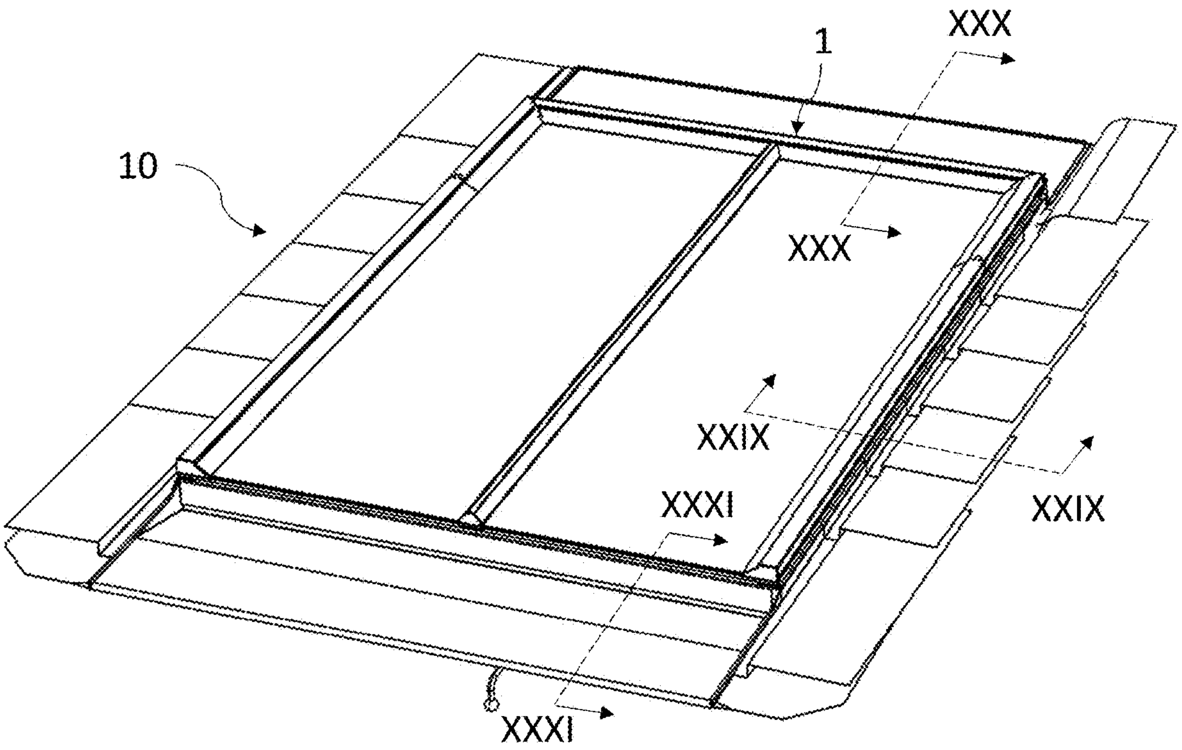
FIG. 24 is a perspective view of a roof window in a general embodiment of the invention, incorporating a flashing assembly.
Figure 25:
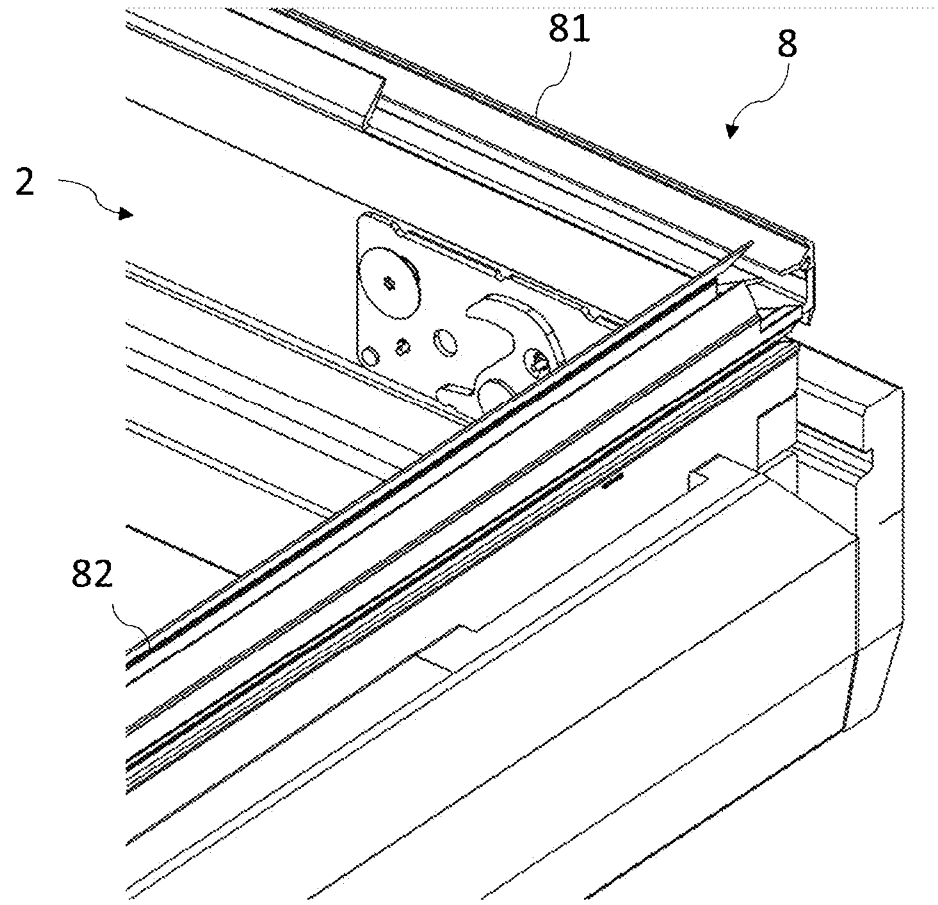
FIG. 25 is a partial perspective exploded view of an upper corner of the frame of the roof window in the embodiment of FIG. 24.

Referring now also to FIGS. 22 and 23, it is seen that the hinge assembly 9 comprises a hinge unit 91 with a frame hinge part 92 connected to or connectable to at least the top frame member 21, a sash hinge part 93 connected to at least the top sash member 31, and a hinge pin 94 connecting the frame hinge part 92 with the sash hinge part 93.

The term “connected to” implies that the component in question is in a condition, state or position in which the component in question is in fact connected to a part, whereas "connectable to" is intended to encompass such conditions, states and positions in which the component in question may be connected to the relevant part, but is not necessarily in connection with the part. In the description of FIGS. 22 and 23, the frame hinge part 92 including any sub-components will be described as being connected to parts of the frame 2.

In the following, a coupling unit 95 of the hinge assembly 9 will be described in some detail. Details of the hinge assembly 9 are described in more detail in Applicant's patent applications filed on the same date as the present application.

The coupling unit 95 is configured to allow selective coupling of at least the frame hinge part 92 of the hinge unit 91 to the top frame member 21 and optionally to one of the side frame members 22, 23. In the following, the coupling unit 95 will be described as comprising both a top frame coupling plate 96 and a side frame coupling plate 97. Alternative configurations are conceivable.

The top frame coupling plate 96 comprises a base section 961 connected to an inner side of the top frame member 21. The top frame coupling plate 96 is connected to the top frame member 21 by means of a plurality of fastening means including at least one spigot 961*c* on the base section 961 and two bolt elements functioning also as engagement pins 962, 963. In this case, each engagement pin 962, 963 cooperates with an insert nut 982, 983 on the outer side of the top frame member 21. To accommodate the top frame coupling plate 96, the top frame member 21 comprises a hinge assembly receiving milling 29*a* and a set of openings 29*c*, 29*e* of which openings 29*e* are through-going openings, or through-holes.

The side frame coupling plate 97 comprises a base section 971 and is connected to the inner side of the side frame member 22 by means of a plurality of fastening means including at least one spigot 971*e* on the base section 971 and at least one opening (not shown in detail) for fastening means such as screws 981. To receive the side frame coupling plate 97, the side frame member 22 comprises a hinge assembly receiving milling 29*b* and a set of openings 29*d*, 29*f*.

Figure 8:
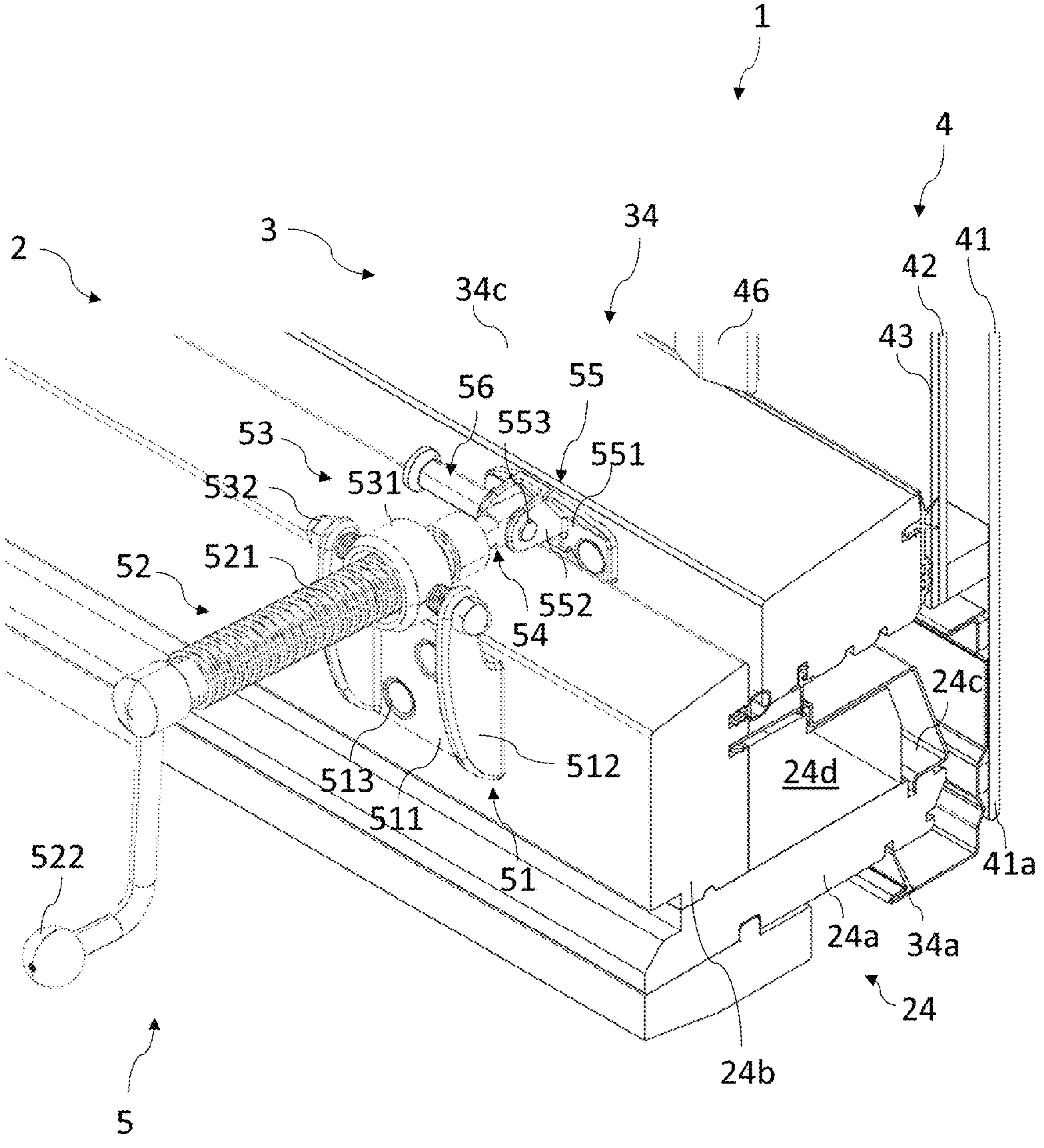
FIG. 8 is a perspective cross-sectional view of a roof window in an embodiment incorporating an operating assembly, corresponding to a cross-section along the line VIII-VIII in FIG. 2.
Figure 10:
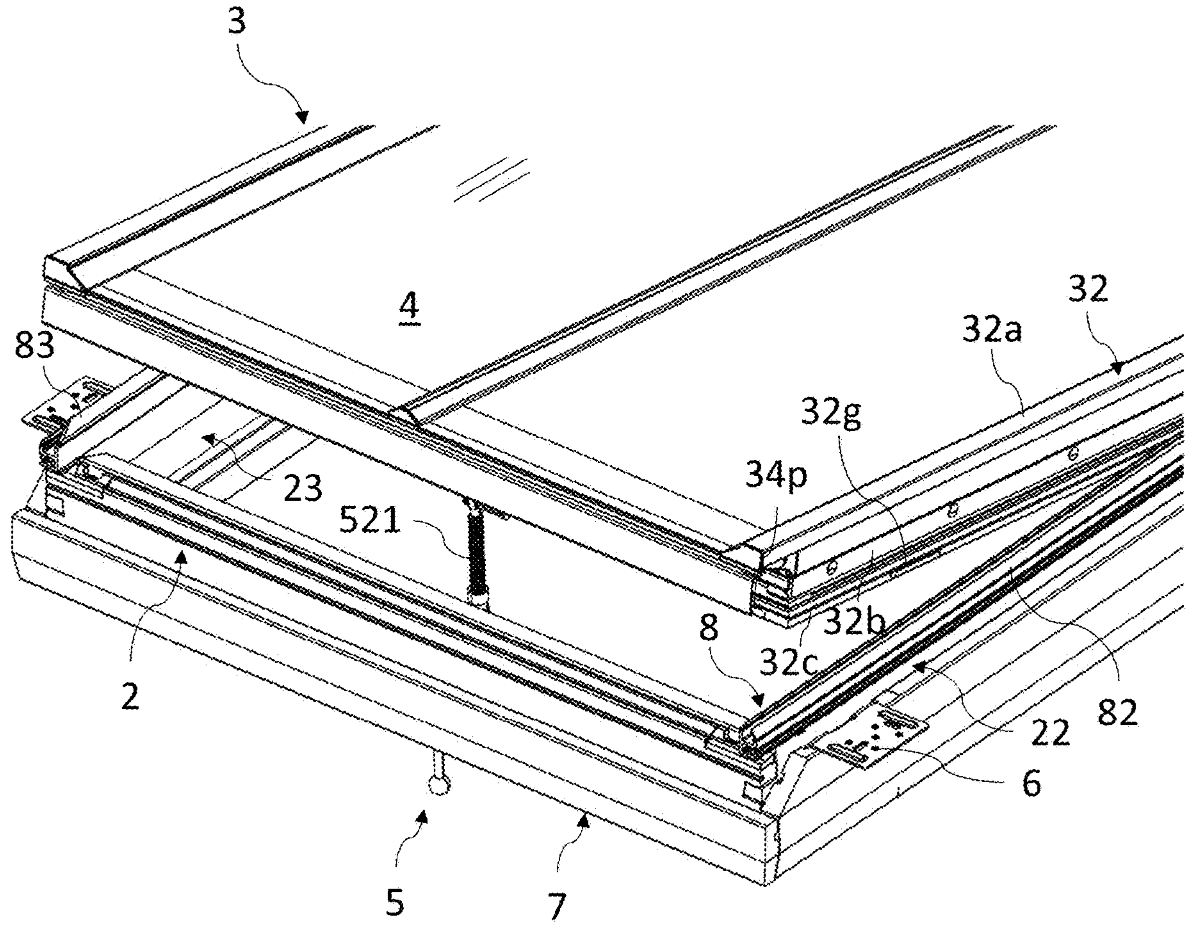
FIG. 10 is a partial perspective view of a roof window incorporating a hinge assembly and an operating assembly, with the sash in an open position.

Operating Assembly—FIGS. 8 and 10

During normal use, i.e. when the roof window 1 has been installed, and a user wishes to put the sash 3 in a ventilating position, the opening, closing and parking may be carried out by the assistance of an operating assembly, for instance as the shown manual handwinder or screwjack constituting the operating assembly 5.

Referring first to FIG. 8, the operating assembly 5 comprises a sash fitting 55, a spindle part 52 with a spindle 521 connected to a socket fitting 51 via a nut part 53, and a handle 522, the sash fitting 55 being connected to the bottom sash member 34 and the socket fitting 51 being connected to the bottom frame member 24 in a mounted condition of the operating assembly such that upon rotation of the spindle part 52 relative to the nut part 53, the bottom sash member 34 is moved relative to the bottom frame member 24.

In the embodiment shown, the roof window 1 may be provided in a supply condition which is suitable for packaging and transportation, the sash fitting 55 is connected to the bottom sash member 34 of the roof window 1 whereas the spindle part 52 with the nut part 53 and the socket fitting 51 are provided separately from the roof window 1.

The nut part 53 comprises a nut ring 531 connected to a set of flanges 512 protruding from a base plate 511 of the socket fitting 51, here by means of a set of bolts 532. Holes 513 are provided in the base plate 511 for mounting the socket part 51 to the bottom frame member 24.

The operating assembly 5 furthermore comprises a split 56 associated to the sash fitting 55, the split 56 being displaceable between an active position in which it is in engagement with a set of openings 553 in a set of flanges 552 protruding from a base plate 551 of the sash fitting 55 and an inactive position to reveal a reception gap between the flanges 552 of the sash fitting 55.

The spindle part 52 comprises an end portion 54 configured to cooperate with the sash fitting 55 in the mounted condition.

Sash and Frame Structure—FIGS. 5 to 16

Figure 5:
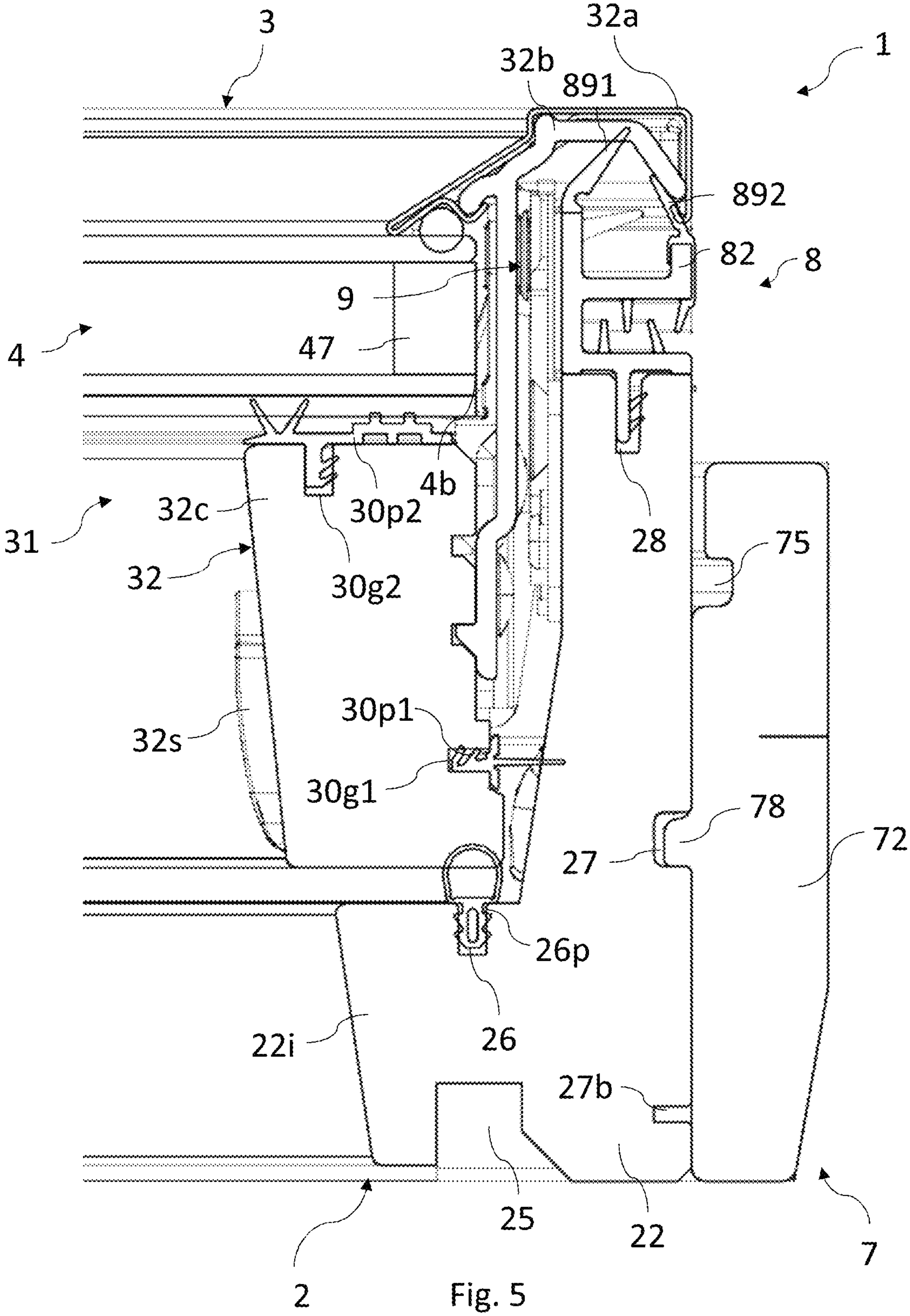
FIG. 5 is a cross-sectional view along the line III-III in FIG. 2.
Figure 9:
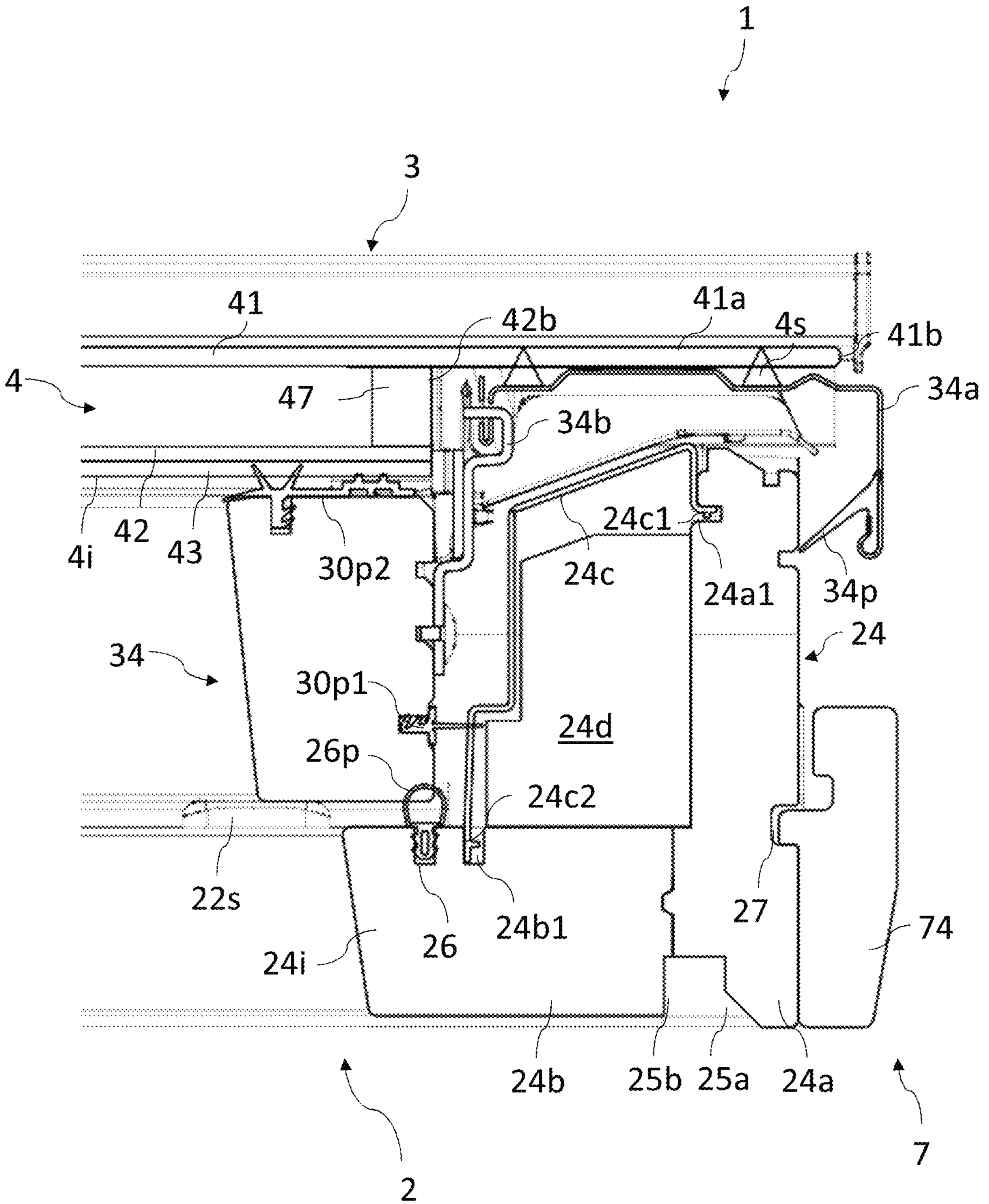
FIG. 9 is a cross-sectional view along a line parallel to the line VIII-VIII in FIG. 2.

As shown in the cross-sectional view of the bottom part of the roof window 1 in FIGS. 8 and 9, the pane 4 comprises an exterior sheet 41 and at least one interior sheet, here two interior sheets 42, 43 placed in contact with each other. The pane 4 is here a so-called stepped pane in which the exterior sheet 41 comprises an extended portion 41*a* extending beyond a bottom edge portion 42*b* of the interior sheets 42, 43 to a bottom edge portion 41*b* of the exterior sheet 41. Referring now also to FIGS. 4 and 5, showing side and top parts of the roof window 1, respectively, the pane 4 has a common side edge portion 4*b*—this applies also to the opposite, not-shown side- and a common top edge portion 4*c*. A spacer 47 is provided between the most exterior interior sheet 42 and the exterior sheet 41 along all edge portions.

Common to all sash members 31, 32, 33, 34 of the sash 3 according to the invention is that each sash member comprises a profile element 31*a*, 32*a*, 34*a*, an inner element 31*c*, 32*c*, 34*c* and an intermediate element 31*b*, 32*b*, 34*b*. Although not indicated, the side sash member 33 not shown in cross-section has a similar configuration as the shown side sash member 32.

The intermediate element 31*b*, 32*b*, 34*b* of the respective sash member 31, 32, 33, 34 forms a connection between the profile element 31*a*, 32*a*, 34*a* and the inner element 31*c*, 32*c*, 34*c* of the sash member 31, 32, 33, 34 in question. The intermediate elements 31*b*, 32*b*, 34*b* of the sash members 31, 32, 33, 34 may in principle be formed in the same way for all four sash members, or be formed with individual properties. Typically, the two side sash members 32, 33 of the sash 3 will be designed with equal properties though.

Figure 12A:
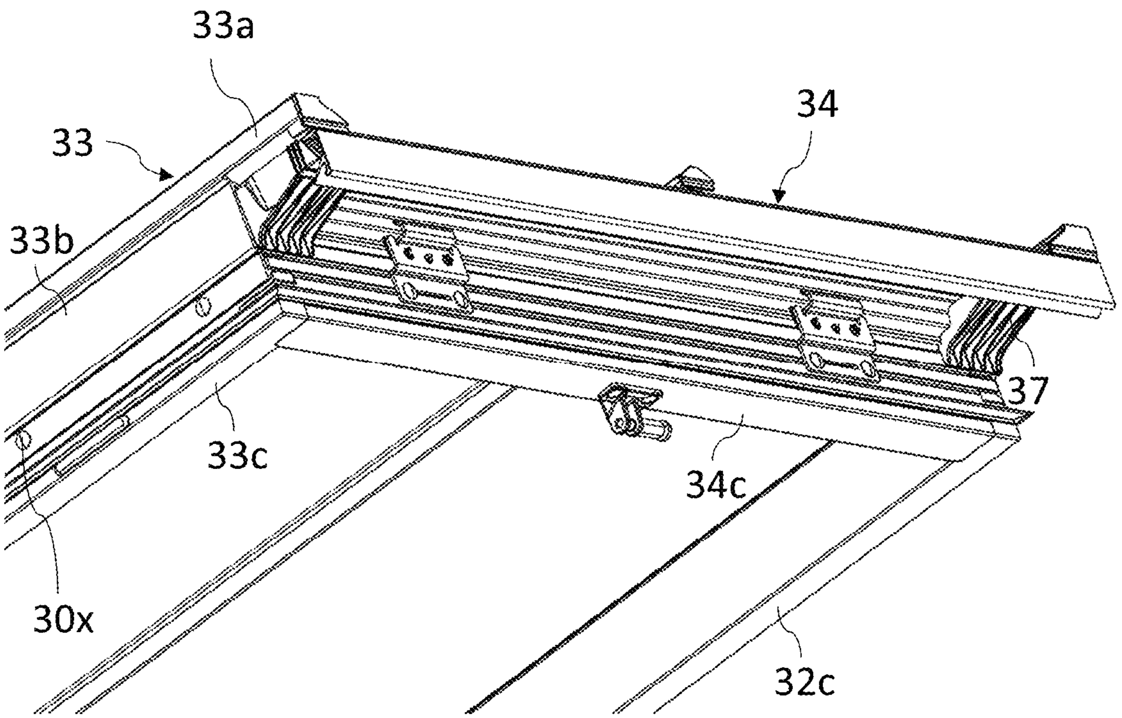
FIG. 12*a* is a partial perspective view of the sash of the roof window of FIG. 10.
Figure 12B:
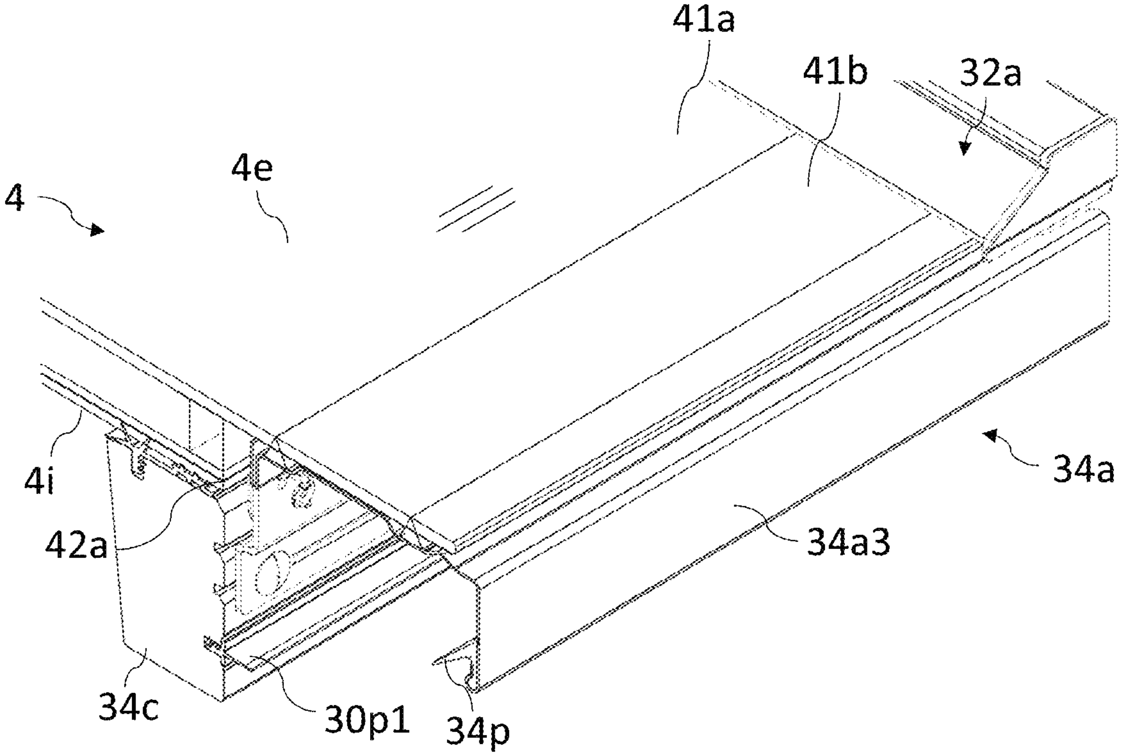
FIG. 12*b* is a perspective sectional view of the sash of FIG. 12*a;*
Figure 13A:
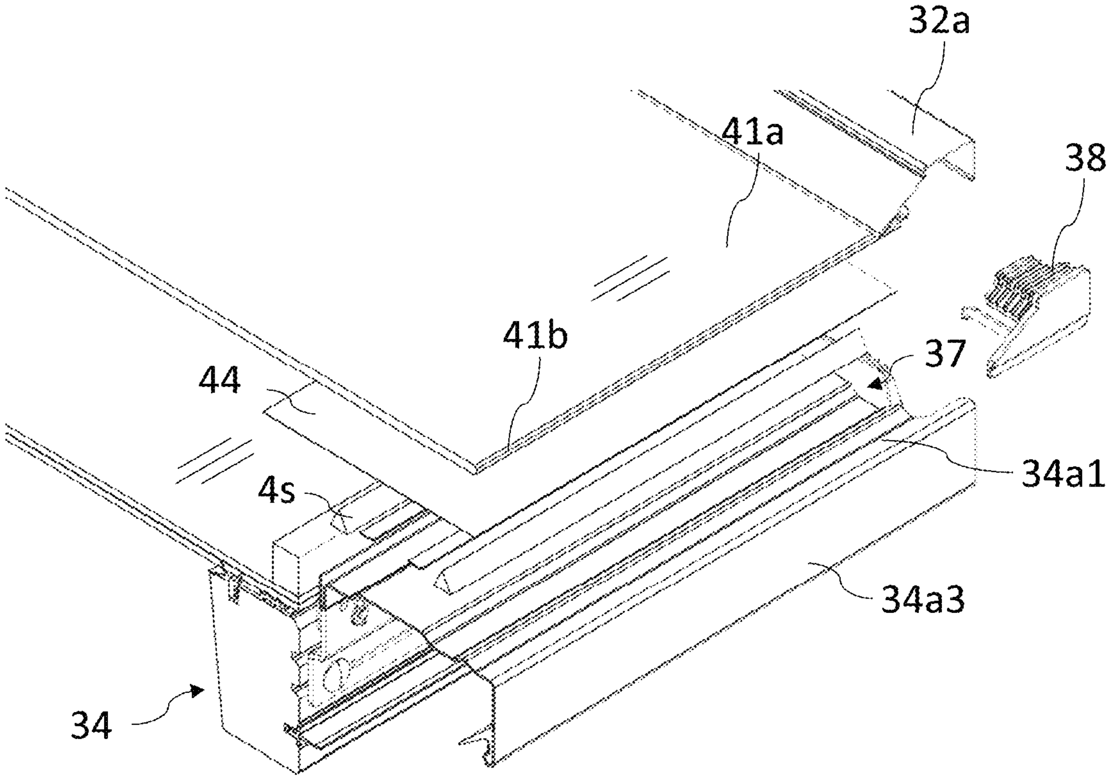
FIG. 13*a* is an exploded sectional view of the details of FIG. 12*a;*
Figure 13B:
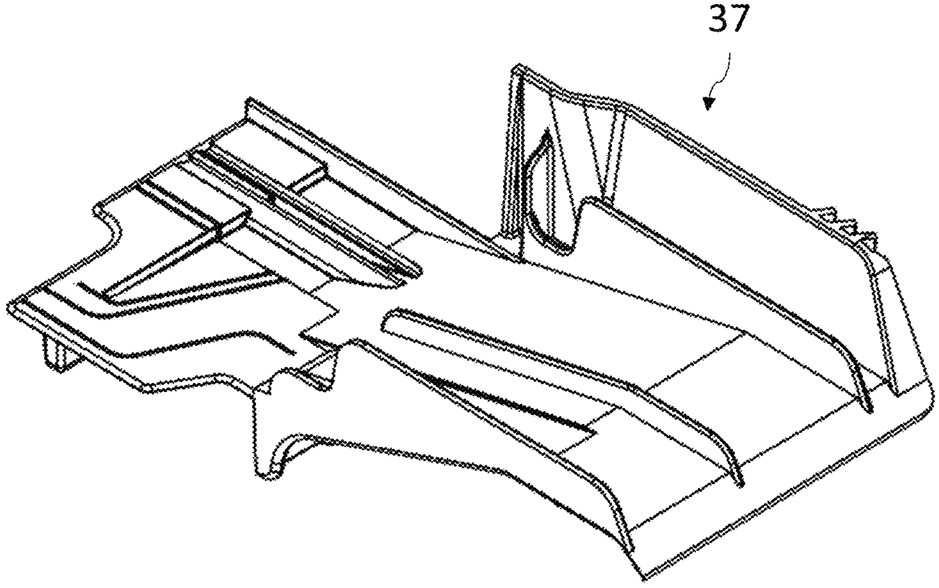
FIG. 13*b* is a perspective view of a detail of the sash of FIG. 12*a;*

Referring also to FIG. 12*a*, the intermediate elements 31*b*, 32*b*, 33*b* of the top sash member 31 and the two side sash members 32, 33, in the embodiment shown, are formed as a set of longitudinal profiles while the intermediate element 34*b* of the bottom sash member 34 comprises a set of separate fittings, described in greater detail in connection with FIGS. 14*a*-*b*. Details of the respective intermediate elements 31*b*, 32*b*, 33*b*, 34*b* will be described below.

The inner elements 31*c*, 32*c*, 33*c*, 34*c* of the sash members 31, 32, 33, 34 form a coherent inner element sash structure supporting an interior edge portion of the pane 4. That is, edge portions of the pane 4 partly overlap the inner elements 31*c*, 32*c*, 33*c*, 34*c* as seen in from the interior. In this way, the top edge portion 4*c*, the side edge portion 4*b*, and the opposite side edge portion, and the bottom edge portion 42*b* of the interior sheet 42 are all located on the outer side of the coherent sash structure provided by the inner elements such that any spacers 47 and other elements present along the edge portions of the pane 4 are hidden from view by the inner elements 31*c*, 32*c*, 33*c*, 34*c* and are thus not visible from the interior of the building. The inner elements 31*c*, 32*c*, 33*c*, 34*c* of the sash members 31, 32, 33, 34 may have a substantially identical cross-sections and be formed by any suitable material, for instance wood, joined in mortise joints at the corners. It is also conceivable to form the inner element structure as a fully coherent structure, for instance by moulding.

As will also be described in further detail in connection with the embodiment below, the profile elements 31*a*, 32*a*, 33*a*, 34*a* of the sash members 31, 32, 33, 34 are located along respective exterior edge portions of the pane 4, and the intermediate element 31*b*, 32*b*, 33*b*, 34*b* of each sash member 31, 32, 33, 34 comprises engagement means 32*b*3, 34*b*3 configured to form a structural connection with the inner element 32*c*, 34*c* in one of at least two distinct positions in the height direction.

Also indicated in FIGS. 5 and 6 is a hinge assembly 9 present in a gap between the top sash member 31 and the top frame member 21, and between the side sash member 32 and the side frame member 22, by which the sash 3 is connected to the frame 2 to provide a tophung hinge connection.

Regarding the frame 2 of the roof window 1, each frame member 21, 22, 23, 24 comprises a plurality of receiving structures at an interior, exterior, inner and/or outer side of the respective frame member. Each receiving structure is configured to interact with auxiliary equipment in an assembled condition of the frame 2.

In the embodiment shown, the top frame member 21 and the two side frame members 22, 23 have substantially identical cross-sections.

Referring particularly to FIGS. 8 and 9, the bottom frame member 24 comprises an outer piece 24*a* and a separate inner piece 24*b*. The outer piece 24*a* and the separate inner piece 24*b* may be formed by the same material as the top frame member 21 and the side frame members 22, 23, for instance wood, or as a composite component comprising plywood and other materials.

A further feature of the roof window 1 in the shown embodiment is that the frame 2 comprises at least one releasable component configured to allow replacement with a different set of components to change the functionality of the roof window 1.

In the embodiment shown, one such releasable component comprises a cover 24*c* releasably connected to remaining components of the bottom frame member 24 and defining a cavity relative to the remaining components of the bottom frame member 24. The cover 24*c* may be formed by any suitable material, for instance a profile element of a plastic or metal material.

Here, where the bottom frame member 24 comprises the outer piece 24*a* and the separate inner piece 24*b*, the cavity defined by the cover 24*c* is defined by the inner side of the outer piece 24*a* in the outwards direction and mainly by the exterior side of the separate inner piece 24*b* towards the interior.

To obtain the releasable connection, edge portions 24*c*1, 24*c*2 of the cover 24*c* are received in receiving grooves in the bottom frame member 24, specifically in one receiving groove 24*a*1 in the outer piece 24*a* and one receiving groove 24*b*1 in the separate inner piece 24*b*.

In the embodiment shown, in which the roof window 1 is prepared for manual operation by means of the operating assembly 5, an insulating piece 24*d* is accommodated in the cavity defined by the cover 24*c*.

In order to change the functionality of the roof window 1, the cavity defined by the cover 24*c* is configured to receive an electrical operator (not shown) and the cover 24*c* is configured to be replaced by a different cover (not shown) allowing operating means of the electrical operator to be connected to the sash 3.

It is also conceivable to allow the sash fitting 55 connected to the bottom sash member 34 to be selectively connected to such an electrical operator in which case the sash fitting 55 is simply reused for the operating means of the electrical operator.

Likewise, it is conceivable to provide the roof window 1 in a condition in which the bottom frame member 24 comprises a dummy element configured to be replaced by the socket fitting 51 of the operating assembly 5.

Correspondingly, if the roof window 1 were provided in a basic form with a different hinge than the hinge assembly 9 described in the above embodiments, it would also be conceivable to use blind plates to cover the hinge assembly receiving millings 29*a*, 29*b* to allow replacement of the previous hinge with the hinge assembly 9.

A first receiving structure comprises a lining groove 25 in an interior side of each frame member 21, 22, 23, 24. The lining grooves 25 are configured to interact with a set of interior lining panels. Such lining panels typically form the transition between the roof window 1 and in interior wall. In the bottom frame member 24, a first groove portion 25*a* is provided in the outer piece 24*a* and a second groove portion 25*b* in the separate inner piece 24*b*. In the assembled condition of the frame 2, the first and second groove portions 25*a*, 25*b* form the lining groove 25.

In the embodiment shown, each frame member 21, 22, 23, 24 comprises an inwards protruding portion 21*i*, 22*i*, 24*i* at least partly overlapping the corresponding sash member 31, 32, 33, 34, as seen in from the interior. This is made possible, since all parts of the sash 3 move towards the exterior when opening the sash 3 relative to the frame 2.

A second receiving structure comprises a sealing groove 26 in an exterior side of the inwards protruding portion 21*i*, 22*i*, 24*i*. The sealing groove 26 is configured to interact with a frame sealing profile 26*p*.

A third receiving structure comprises a first outer groove 27 in an outer side of the frame member 21, 22, 23, 24. The first outer groove 27 is configured to interact with a respective piece 71, 72, 73, 74 of the insulating frame 7. The interaction may take place by introducing a longitudinal protrusion 78 of the insulating frame piece into the groove 27, or to locate separate fastening means correctly.

Taking again the perspective as seen from a user from the interior of the building, in the roof of which the roof window 1 is installed, it is also noted that the inwards protruding portion 21*i*, 22*i*, 24*i* of each frame member 21, 22, 23, 24 has an inwards facing surface which together form a coherent inwards facing surface. As indicated, this appearance mimics a corresponding coherent inwards facing surface of the sash 3.

A fourth receiving structure comprises an interface unit groove 28 in an exterior side of the top frame member 21 and the two side frame members 22, 23. This interface unit groove 28 interacts with a respective top and side element 81, 82, 83 of an interface unit 8, the function of which will be described further below.

Further details visible in the drawings include guiding elements 22*g* (see FIG. 7) and 32*g* (see FIG. 10), which ascertain that the sash 3 is aligned relative to the frame 2 when closing the sash such that any skewness occurring in the open position of the sash 3 is eliminated. A screening mounting bracket 32*s* is visible in FIG. 8, by which it is possible to install an interior screening device (not shown) in the sash 3 to provide screening of the pane 4. An abutment element 22*s* provides a stop for the bottom sash member 34 during closing.

Figure 11:
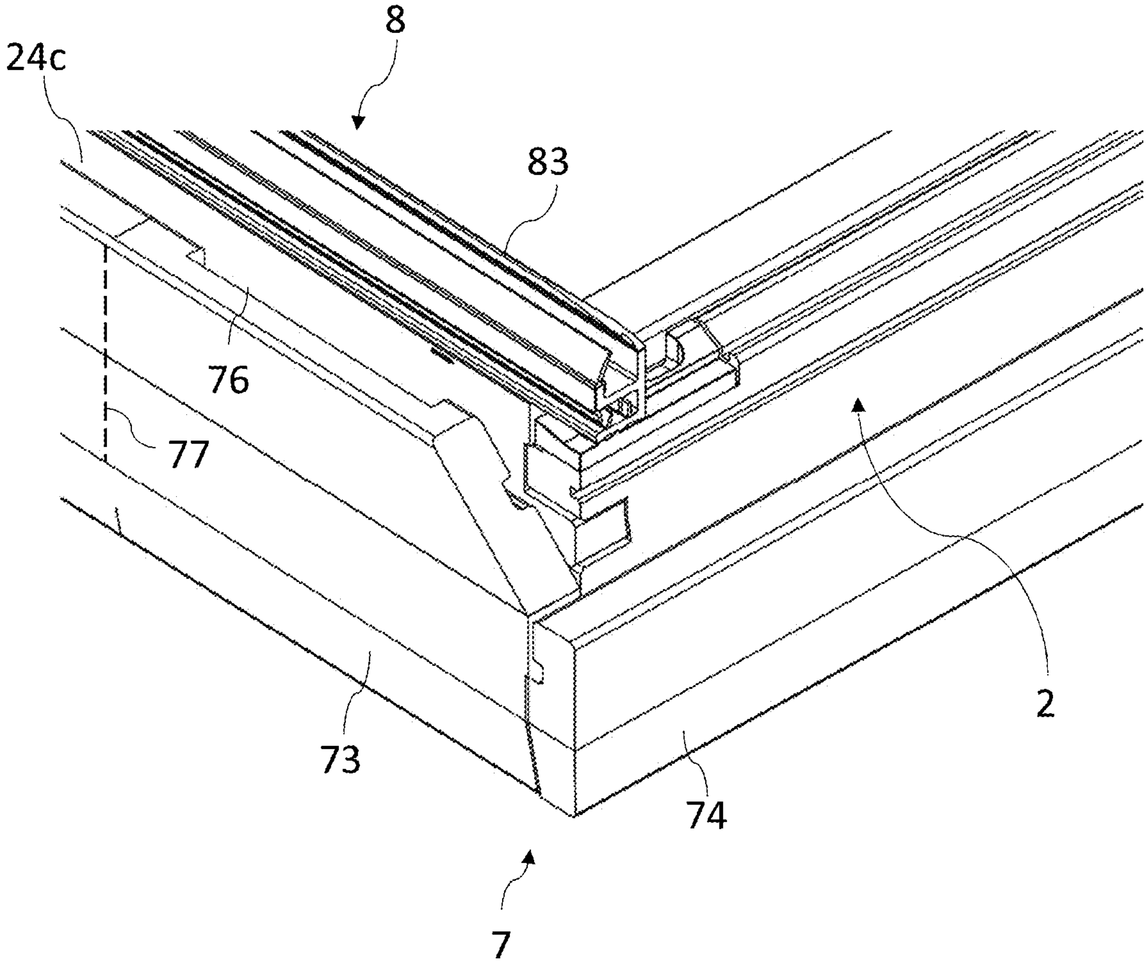
FIG. 11 is a partial perspective sectional view of the frame of the roof window of FIG. 10, together with an insulating frame.

Details of the insulating frame 7 are also shown in these figures; as mentioned in the above, the insulation frame 7 includes top piece 71, side pieces 72, 73, and bottom piece 74. In the embodiments shown, each such insulation frame piece comprises protrusion 78 to be received in the outer side of the respective frame member, and an indentation 75 to interact with auxiliary equipment in the form of an underroof collar described in more detail in Applicant's patent applications filed on the same date as the present application. With particular reference to FIG. 11, a recess 76 is shown which makes place for the mounting bracket 6 to be mounted on the side frame member 23 of the frame 2, and a folding line 77 which allows folding back of part of the side piece 73 of the insulating frame 7 to allow access to the outer side of the side frame member 23. At least the side pieces 72, 73 of the insulating frame 7 are provided with such recesses 76 and folding lines 77 at or near the location of the intended positions of the mounting brackets 6 of the set of mounting brackets supplied with the roof window 1. The insulating frame 1 may in principle be made from any material with suitable thermal insulating properties. It is presently preferred that a foam material be used, for instance polyethylene foam.

Intermediate Elements—FIGS. 5 to 16

Turning now to the description of the connection between the elements of the sash 3, the engagement between the intermediate elements 31*b*, 32*b* and 33*b* of the top sash member 31 and the two side sash members 32, 33 and the respective inner element 31*c*, 32*c*, 33*c* will be described first.

Figure 16:
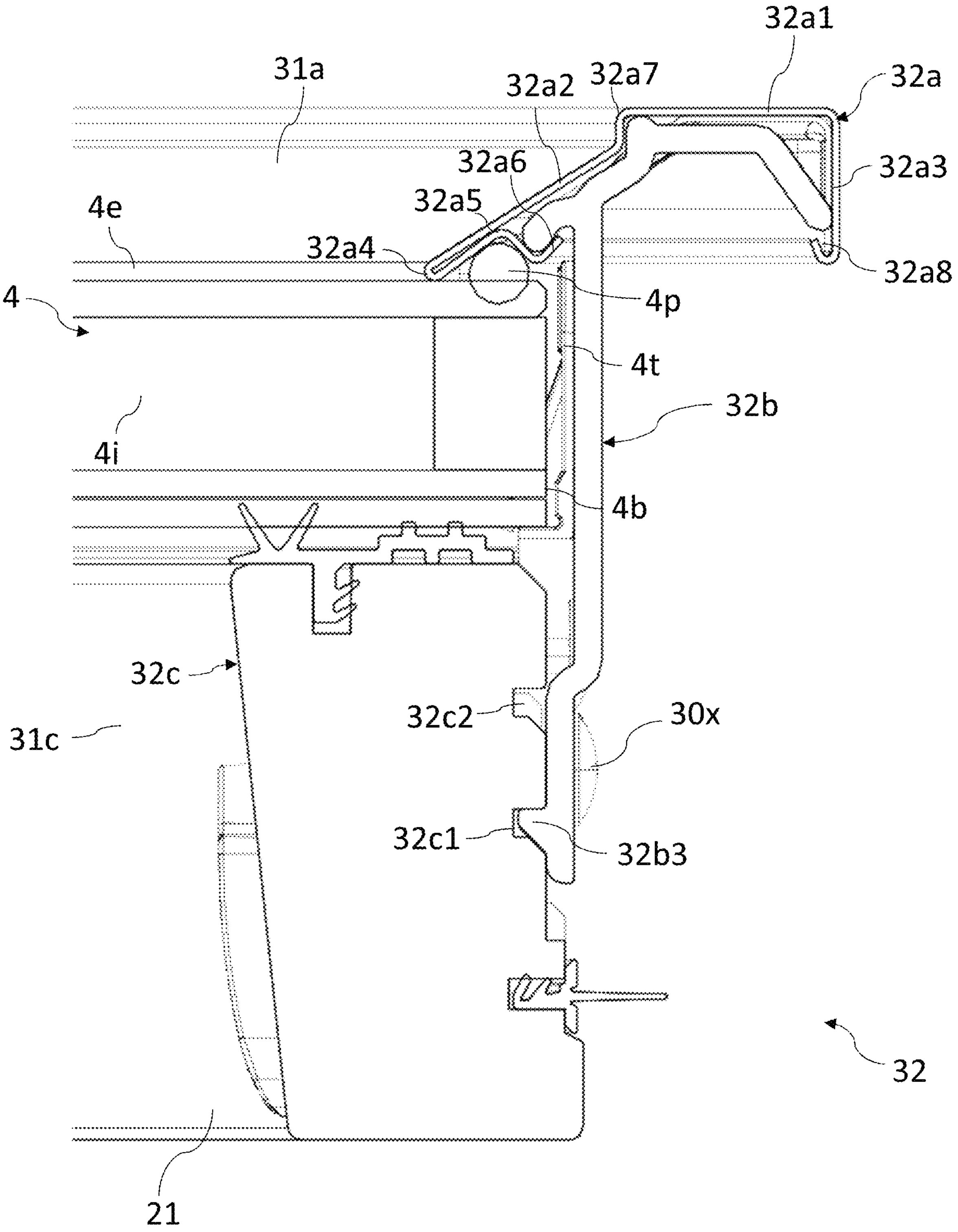
FIG. 16 is a sectional view corresponding to FIG. 5, but of the sash isolated from the frame.

With particular reference to FIG. 16, an outer side of each inner element, here as shown the inner element 32*c* of the side sash member 32, is provided with reception means configured to receive the engagement means of the intermediate element 32*b* of the side sash member 32.

In the embodiment shown, the reception means comprises two longitudinally extending grooves 32*c*1, 32*c*2 at a distance from each other in the height direction, the grooves being open in an outwards direction of the roof window 1.

In the embodiment shown, the longitudinal profiles forming the intermediate elements 31*b*, 32*b*, 33*b* have a uniform cross-section and may in principle be cut from one and the same profile length. It is preferred that the longitudinal profiles are formed by a continuous moulding process, such as extrusion or pultrusion. Specifically the profiles are formed by pultrusion of a composite material incorporating resin and glass fibre.

Figure 15:
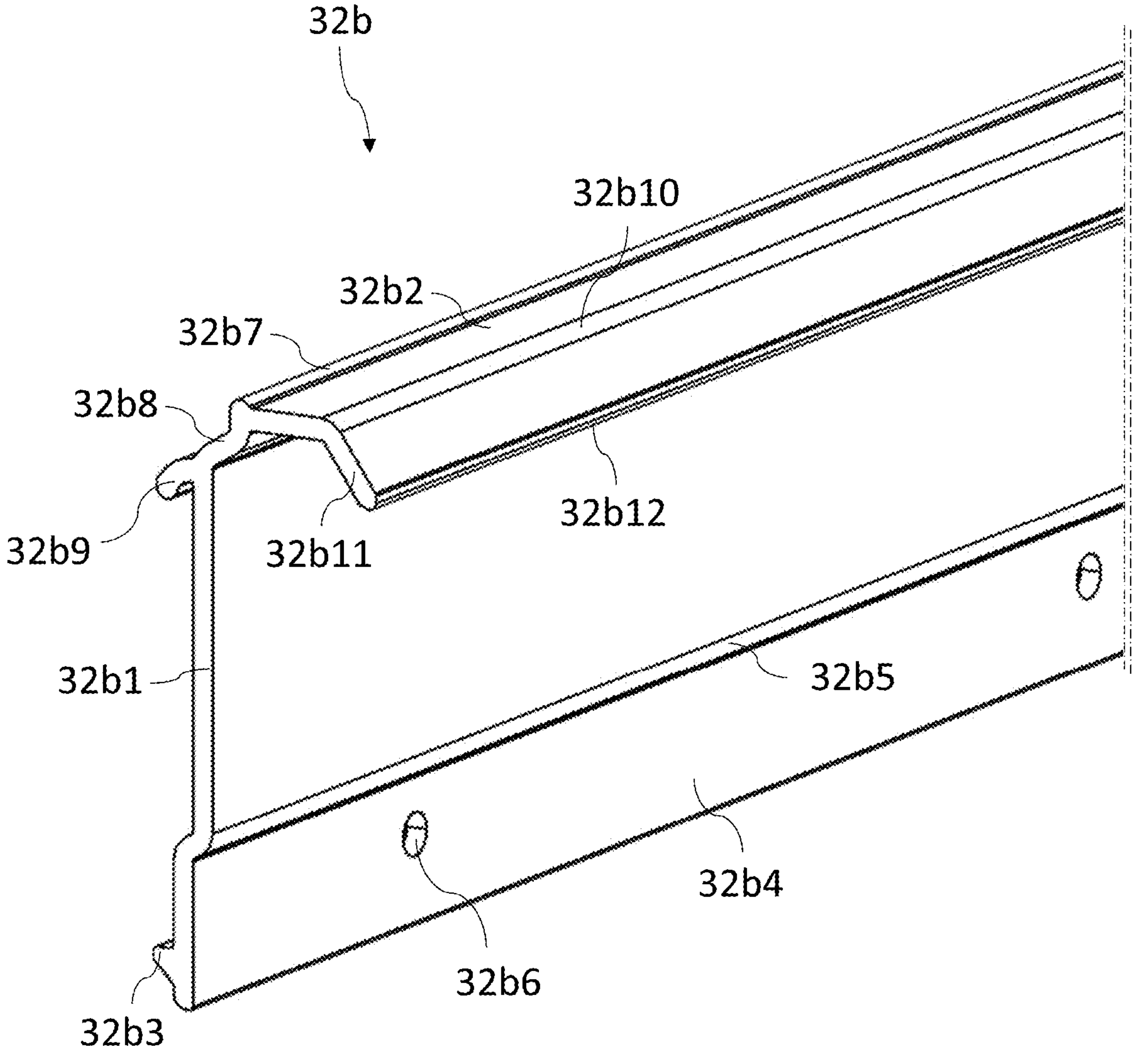
FIG. 15 is a partial perspective view of an intermediate element of the sash of the roof window of FIG. 10.

Thus, only one of these intermediate elements will be described in detail, namely intermediate element 32*b*. Referring now to FIG. 15, the intermediate element 32*b* comprises a base portion 32*b*1 extending substantially in the height direction in the assembled condition of the sash 3 and a head portion 32*b*2 extending at an angle to the base portion 32*b*1. The base portion 32*b*1 is provided with the engagement means on a surface facing inwards in the assembled condition, facing an outer surface of the inner element 32*c*, as shown in FIG. 16. The position, location and length of the individual intermediate elements 31*b*, 32*b* and 33*b* appear also from FIGS. 3, 4, 5, 10 and 12*a*.

In the embodiment shown, the engagement means of the base portion 32*b*1 of the intermediate element 32*b* comprises a protruding portion formed as a flange 32*b*3 extending throughout the length of the profile and configured to engage with a selective one groove 32*c*1, 32*c*2 of the inner element 32*c* of the side sash member 32.

The base portion 32*b*1 of each intermediate element 32*b* comprises a stepped section 32*b*4, which is offset in the inwards direction by an offsetting bend 32*b*5 relative to the remaining section of the base portion 32*b*1. The engagement means, here the flange 32*b*3, is provided in the stepped section 32*b*4.

Additional fastening means 30*x* (cf. FIGS. 12*a* and 16) are provided to fasten the intermediate element or elements 32*b* to the inner element 32*c* of the side sash member 32. In order to receive the additional fastening means 30*x*, the base portion 32*b*1 of the intermediate element 32*b* comprises openings 32*b*6 configured to receive the additional fastening means 30*x*, namely in the stepped section 32*b*4.

Figure 14A:
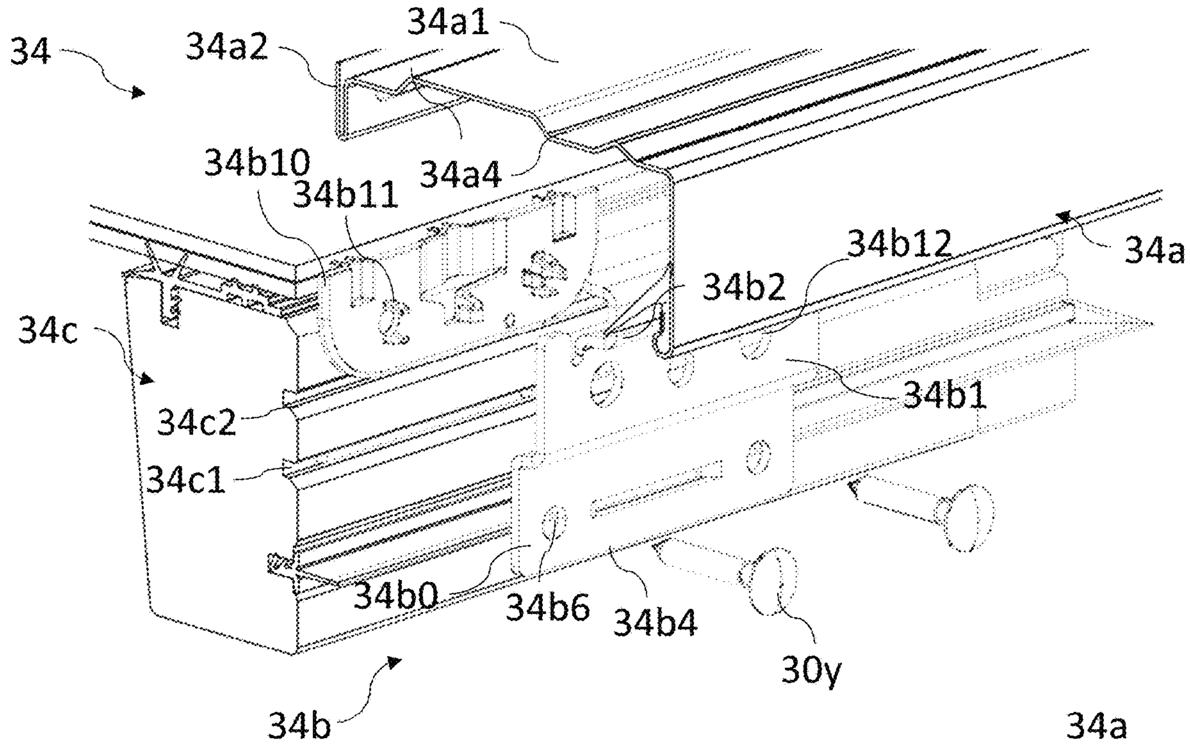
FIG. 14*a* is a partially exploded perspective view of the sash of FIG. 12*a;*
Figure 14B:
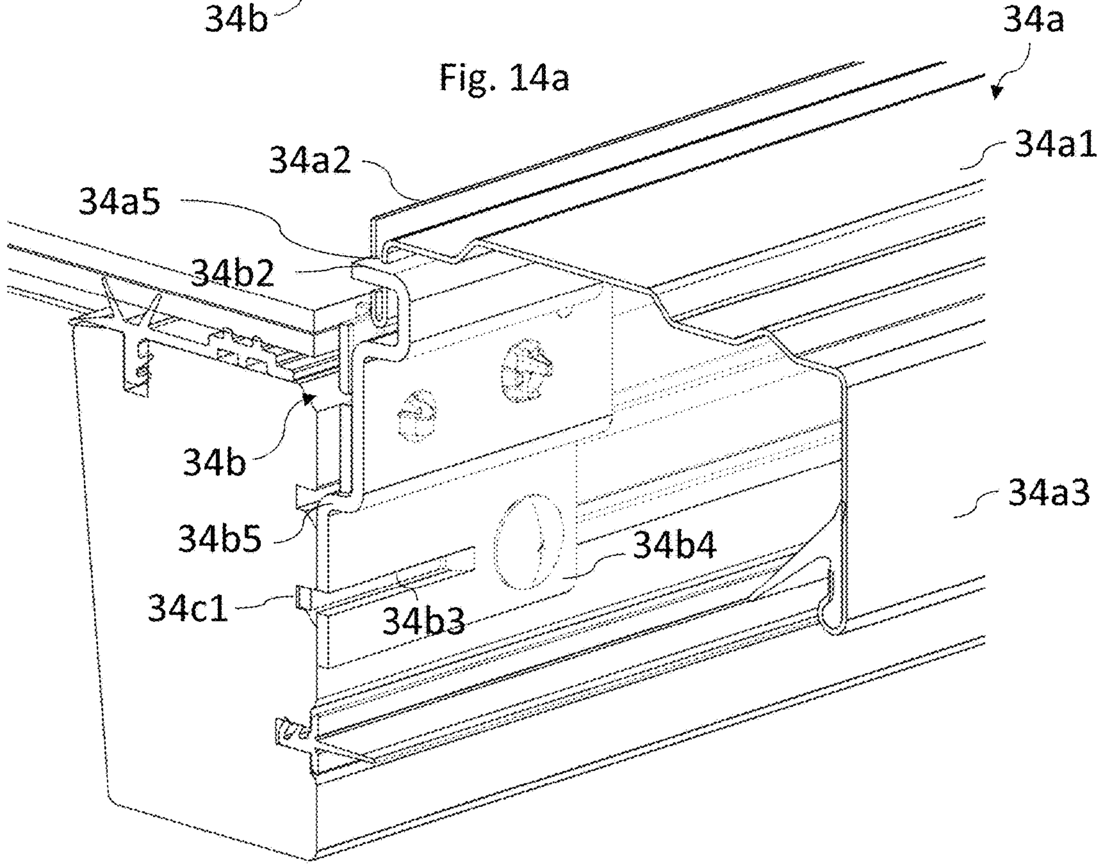
FIG. 14*b* is a perspective sectional view of details shown in FIG. 13*a;*

Turning now in particular to FIGS. 14*a* and 14*b*, the connection between the intermediate element 34*b* and the inner element 34*c* of the bottom sash member 34 will be described in detail.

Just as the intermediate elements 31*b*, 32*b*, 33*b* described in the above, the intermediate element 34*b* comprises a base portion 34*b*1 extending substantially in the height direction and a head portion 34*b*2 extending at an angle to the base portion 34*b*1. The base portion 34*b*1 is provided with the engagement means 34*b*3 on an inner surface, facing an outer surface of the inner element 34*c*. The engagement means of the base portion 34*b*1 comprises a protruding portion 34*b*3 to engage with a selective one groove 34*c*1, 34*c*2 of the inner element 34*c* of the bottom sash member 34. Additional fastening means 30*y* are provided to fasten the intermediate element 34*b* to the inner element 34*c* of the bottom sash member 34, in openings 34*b*6 in stepped section 34*b*4, which is offset in the inwards direction by offsetting bend 34*b*5 relative to the remaining section of the base portion 34*b*1.

In the embodiment shown, the intermediate element 34*b* of the bottom sash member 34 comprises a set of fittings. Two such sets may be provided along the length of the bottom sash member 34.

Each set of fittings comprises a connecting fitting provided with the engagement means configured to form a structural connection with the inner element 34*c* in one of at least two distinct positions in the height direction. The connecting fitting comprises a first fitting part 34*b*0 and a second fitting part 34*b*10. The first fitting part 34*b*0 comprises the engagement means and the second fitting part 34*b*10 is configured to be connected to the first fitting part 34*b*0 to function as a spacer between the outer surface of the inner element 34*c* of the bottom sash member 34 and the first fitting part 34*b*0. To connect the first and second fitting parts 34*b*0, 34*b*10 with each other, the second fitting part 34*b*10 is provided with at least one resilient hook 34*b*11 configured to interact with a corresponding opening 34*b*12 in the first fitting part 34*b*0. The head portion 34*b*2 of the intermediate element 34*b* of the bottom sash member 34 is received in a slit 34*a*5 of an inner portion 34*a*2 of the profile element 34*a* of the bottom sash member 34 in the assembled condition of the sash 3.

Figure 17:
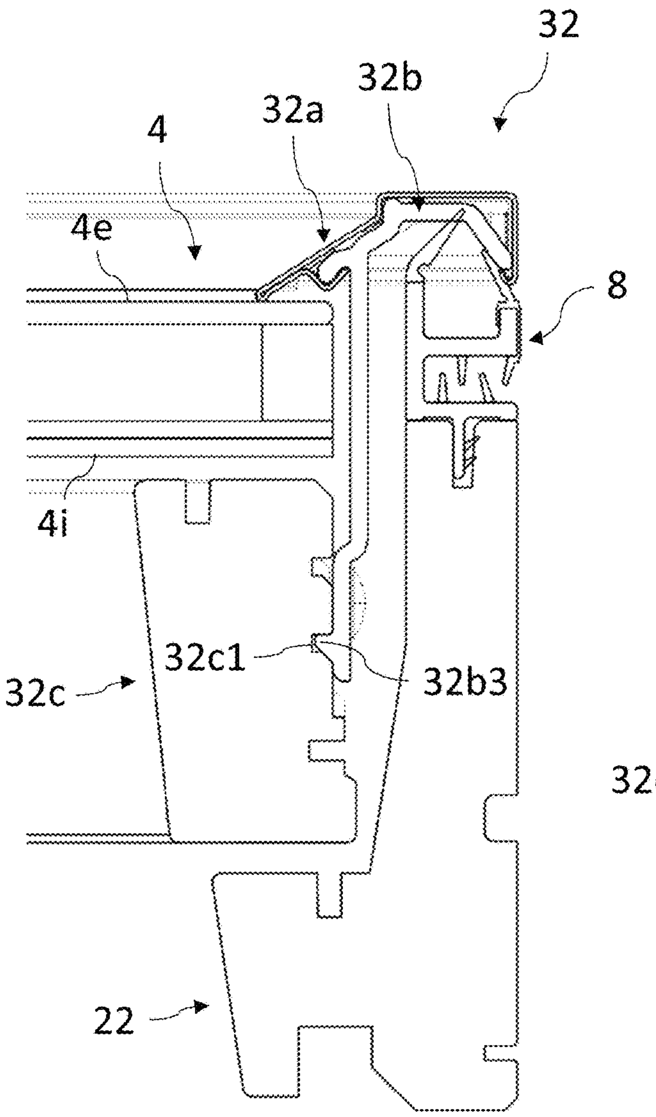
FIG. 17 is a simplified cross-sectional view corresponding to FIG. 16.
Figure 18:
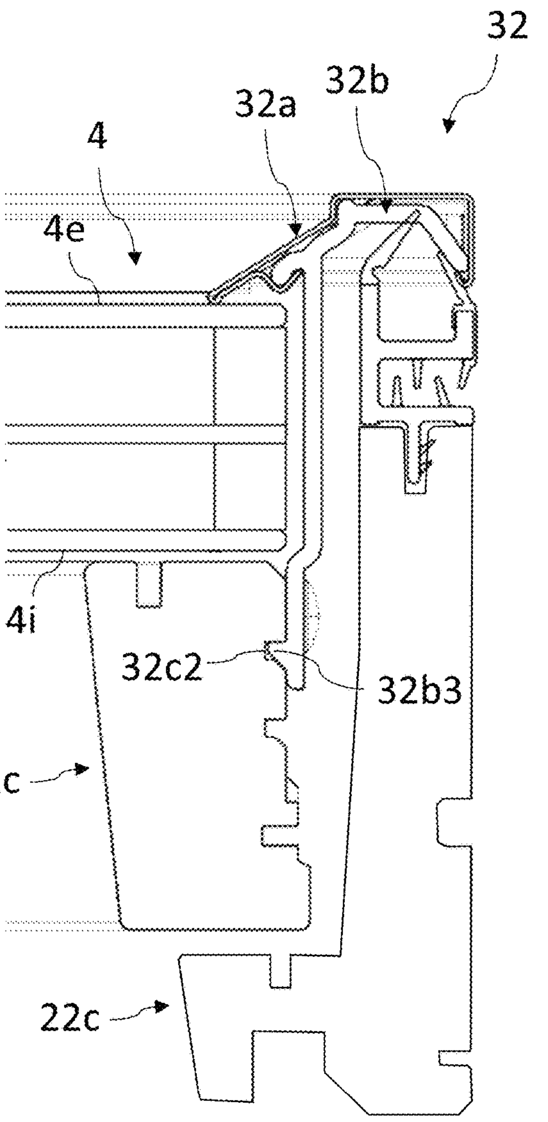
FIG. 18 is a view corresponding to FIG. 17, of a roof window in another embodiment of the invention, in which the pane has a larger total thickness.

Comparison Embodiments—FIGS. 17 and 18

Turning now to FIGS. 17 and 18, showing a simplified overview of the main components of the side sash member 32, it is seen how the same components of the sash 3 may accommodate two different thicknesses of the pane 4. This is carried out by changing the position of the engagement means of the intermediate element 32*b* from the first groove 32*c*1 to the second groove 32*c*2. This will require a slightly adapted side frame member 22*c*. The intermediate elements 31*b*, 33*b*, 34*b* at the other sash members 31, 33, 34 are moved similarly.

Figure 19:
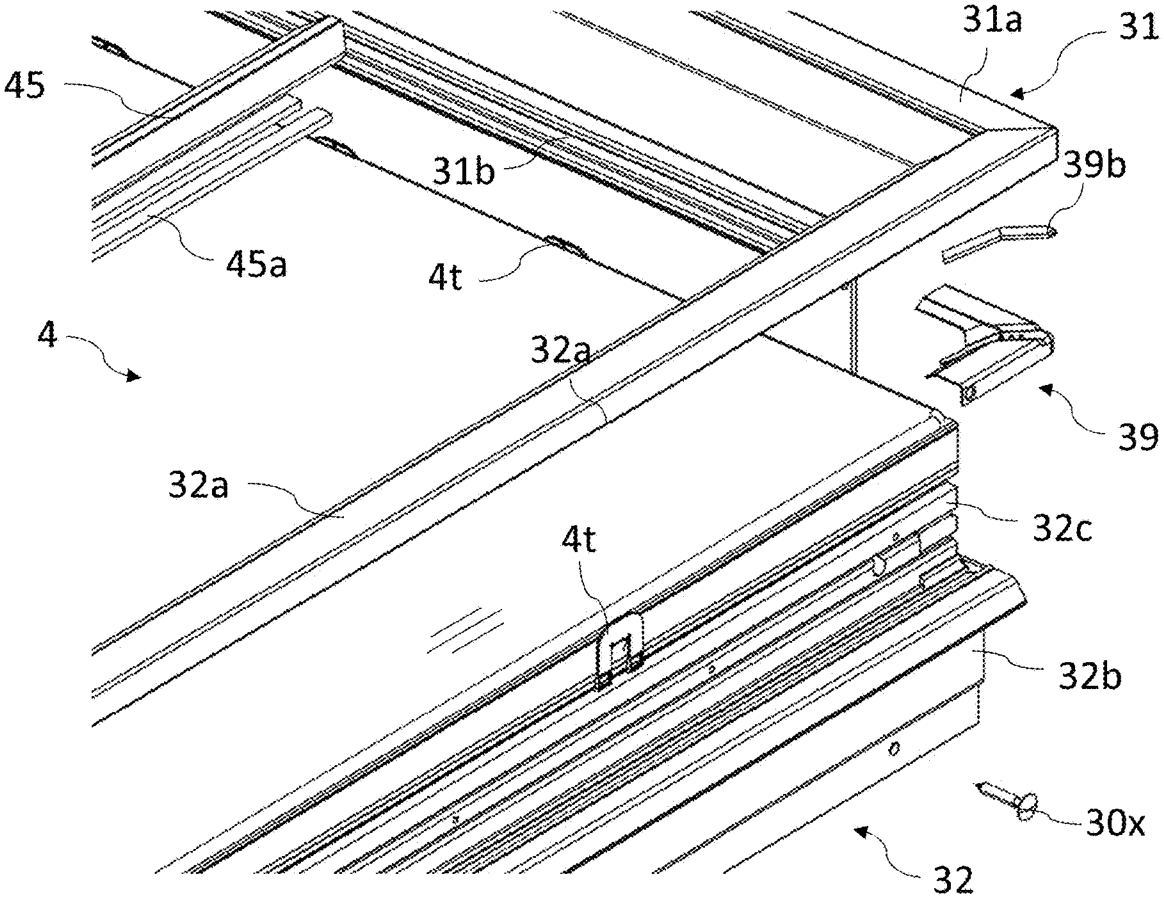
FIG. 19 is an exploded perspective view of an upper corner of the sash of a roof window in a further embodiment.
Figure 20:
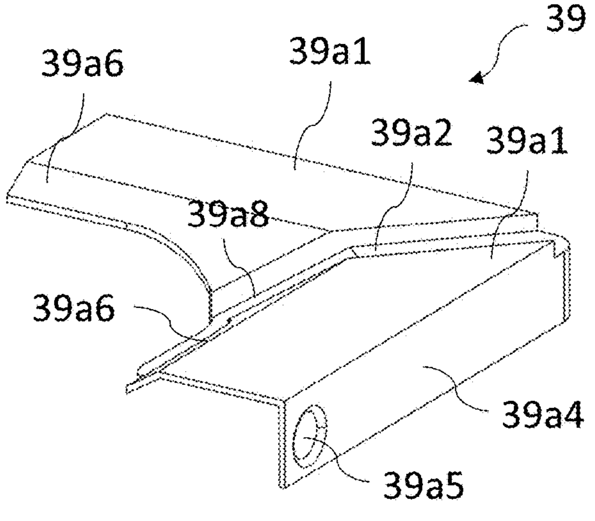
FIGS. 20 and 21 are perspective views, seen from different angles, of a corner key of the sash of FIG. 19.
Figure 21:
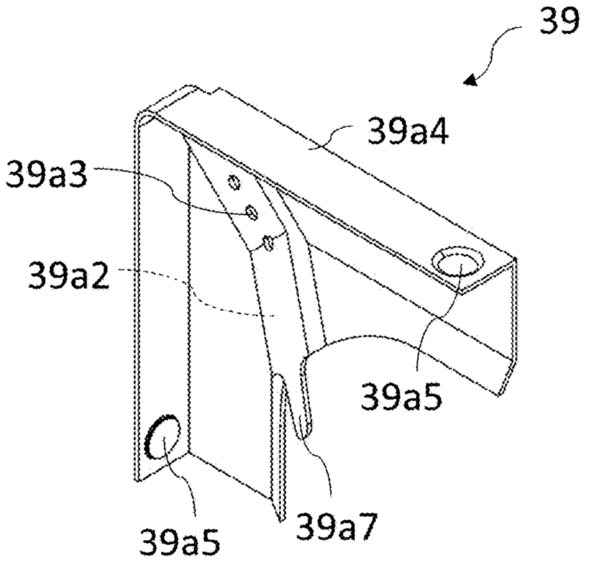

Profile Elements—FIGS. 19 to 21

Focus will now be on the profile elements of the sash 3. The general configuration of the profile elements 31*a*, 32*a* and 33*a* of the top and side sash members 31, 32, 33 is shown in the perspective views of FIGS. 3 to 6 and 10 while details are shown in the cross-sectional view of FIG. 16. The profile element 34*a* of the bottom sash member 34 is shown most clearly in FIGS. 12*a* to 14*b*.

Corresponding to the above, only the profile element 32*a* of the side sash member 32 will be described in representation of the longitudinal profiles of the top sash member 31 and the two side sash members 32, 33, since in the embodiment shown, these profile elements are formed as a set of longitudinal profiles of substantially uniform cross-section.

The details common to all profile elements 31*a*, 32*a*, 33*a*, 34*a* are as follows:

Each profile element 32*a*, 34*a* comprises a head portion 32*a*1, 34*a*1 and an adjoining outer portion 32*a*3, 34*a*3.

The head portion 32*a*1, 34*a*1 is substantially parallel to the plane of the roof window 1 in the assembled condition of the roof window 1, and the adjoining outer portion 32*a*3, 34*a*3 is substantially perpendicular to the head portion 32*a*1, 34*a*1.

However, the head portion 32*a*1 of the profile element 32*a* of each of the top and side sash members 31, 32, 33 is located on the exterior side of the exterior pane surface 4*e*, and on the outer side of the side edge portion 4*b* and the top edge portion 4*c* of the pane 4, whereas the head portion 34*a*1 of the profile element 34*a* of the bottom sash member 34 is located on the interior side of the extended portion 41*a* of the exterior sheet 41 of the pane 4.

The profile element 32*a* of the side sash member 32 and the profile element 34*a* of the bottom sash member 34 are thus separated by a layer of glass; nevertheless, an overlap is provided by selecting a length of the profile elements 32*a*, 33*a* of the two side sash members 32, 33 to substantially correspond to or slightly exceed the distance between the top edge portion 4*c* of the pane 4 and the bottom edge portion 41*b* of the exterior sheet 41 of the pane 4. The length of the profile element 34*a* of the bottom sash member 34 is suitably selected to extend substantially to the side edge portion 4*b* of the pane 4.

The length of the profile element 31*a* of the top sash member 31 is chosen in accordance with the dimensions of the pane 4 and the desired manner of joining the profile element 31*a* to the profile elements 32*a*, 33*a*. In the embodiment shown, the longitudinal profiles form mitred joints between the profile element 31*a* of the top sash member 31 and the respective profile elements 32*a*, 33*a* of the side sash members 32, 33 in the assembled condition of the sash 3, see FIG. 19.

Also visible in FIGS. 12*a* to 13*b* are an end plug 38 which closes off the profile element 32*a* of the side sash member 32. The end plug 38 is provided with friction-increasing ribs and a snap arm, not described in detail. The glazing bar 45 is provided with a counterpart end plug. Furthermore, a trailing element 37 is provided to drain any condensed water out to a profile element sealing 34*p*.

To ensure a tight joint at the mitred joints, a corner key 39 is provided at each mitred joint, see FIGS. 19-21. During manufacture, a sealant 39*b* is suitably applied as will be described in further detail below with particular reference to FIGS. 19 to 21.

The corner key 39 has a generally L-shaped configuration with two perpendicular legs 39*a*1 divided by a channel 39*a*2. In the channel 39*a*2, a set of primary openings 39*a*3 is provided.

Furthermore, each leg 39*a*1 is adjoined by a depending skirt 39*a*4 on a first side. Here, a secondary opening 39*a*5 is provided.

In order to fit the profile of the profile elements 31*a*, 32*a*, 33*a*, each leg 39*a*1 is adjoined by an inclined section 39*a*6 on a second side.

As shown in FIGS. 20 and 21, the channel 39*a*2 ends in a tongue 39*a*7, optionally adjoining an inclined channel section 39*a*8.

The profile elements 31*a*, 32*a*, 33*a* are suitably configured to receive the pane 4 in an upside-down position, i.e. with the respective head portions 32*a*1 facing a substrate such as an assembly table. This step of the assembly of the sash 3 may take place after the intermediate elements 31*b*, 32*b*, 33*b* have been introduced into the respective profile elements 31*a*, 32*a*, 33*a*. Also visible in FIGS. 16 and 19, are pane clips 4*t*, which are placed at suitable distances from each other along the top edge portion 4*c* and side edge portions 4*b* of the pane 4. In the embodiment shown, the interaction between the main components of the sash 3 is defined by the following configuration of the components:

Each of the longitudinal profiles forming the profile elements 31*a*, 32*a*, 33*a* of the top sash member 31 and the two side sash members 32, 33 comprises an inner portion 32*a*2 adjoining the head portion 32*a*1. The dimensions are chosen such that the inner portion 32*a*2 overlaps the pane 4 in the assembled condition of the sash 3.

The head portion 32*a*1 of each profile element 31*a*, 32*a*, 33*a* is configured to protrude to the exterior relative to the exterior surface of the pane 4*e* in the assembled condition of the sash 3.

The inner portion 32*a*2 is inclined from the head portion 32*a*1 relative to the head portion 32*a*1 and extends inwards and to the interior, towards the exterior surface of the pane 4*e* in the assembled condition of the sash 3.

The inner portion 32*a*2 is adjoined by a first bend 32*a*4 configured to be located at or near the exterior surface of the pane 4*e*.

A second bend 32*a*5 is provided as shown in for example FIG. 16. The second bend 32*a*5 has as its function to accommodate a sealing 4*p* relative to the exterior surface of the pane 4*e*.

A third bend 32*a*6 is also provided, said third bend 32*a*6 being configured to accommodate an inner edge portion 32*b*9 of the intermediate element 32*b* relative to an interior side of the inner portion 32*a*2. For a detailed overview of the intermediate element 32*b*, confer FIG. 15.

A transition portion 32*a*7 is provided between the head portion 32*a*1 and the inner portion 32*a*2. The transition portion 32*a*7 is configured to accommodate a ridge portion 32*b*7 of the intermediate element 32*b*.

A fourth bend 32*a*8 is provided adjacent the outer portion 32*a*3 of the profile element 32*a*. The fourth bend 32*a*8 is configured to accommodate an outer edge portion 32*b*12 of the intermediate element 32*b*.

The inner portion 32*a*2 of the profile element 32*a* is configured to be located opposite an inner inclined portion 32*b*8 of the intermediate element 32*b* in the assembled condition of the sash 3.

Finally, the outer edge portion 32*b*12 of the intermediate element 32*b* is associated with the head portion 32*b*2 of the intermediate element 32*b* via an outer inclined portion 32*b*11 and a bend 32*b*10.

All in all, the configuration of the described embodiment makes it possible to provide a secure engagement between the intermediate elements 31*b*, 32*b*, 33*b* and the profile elements 31*a*, 32*a*, 33*a*.

The length of the intermediate elements 32*b*, 33*b* of the side sash members 32, 33 may be chosen slightly shorter than the associated profile element 32*a*, 33*a*.

At the bottom sash member 34, the head portion 34*a*1 of the profile element 34*a* is provided with at least one longitudinally extending groove 34*a*4 to receive a respective sealing strip 4*s*. These sealing strips 4*s* may be formed by silicone to form an adhesive connection between the profile element 34*a* and the extended portion 41*a* of the exterior sheet 41 of the pane 4. A masking 44 may be provided at the extended portion 41*a* on in interior side of the exterior sheet 41.

As described in the above, the intermediate element 31*b*, 32*b*, 33*b*, 34*b* of each sash member 31, 32, 33, 34 comprises engagement means 32*b*3, 34*b*3 configured to form a structural connection with the inner element 31*c*, 32*c*, 33*c*, 34*c*. To secure the intermediate element 34*b* of the bottom sash member 34 also to the profile element 34*a*, the head portion 34*b*2 of the intermediate element 34*b* is configured to be received in a slit 34*a*5 of an inner portion 34*a*2 of the profile element 34*a* of the bottom sash member 34 in the assembled condition of the sash 3, see FIGS. 14*a-b*. To increase the strength of the inner portion 34*a*2, this portion may be formed as a double-layer, folded portion.

The manufacture of the sash 3 may in principle take place in any suitable manner. In the following, one presently preferred method will be described:

In a first step, a set of three longitudinal profiles is provided. The longitudinal profiles may for instance be formed a single profile length of an extruded material such as metal, for instance aluminium. Other materials and manufacturing processes are conceivable, including roll forming of steel or other metal, or of a composite material.

Secondly, mitre shapes are formed at mutually facing ends of the longitudinal profiles. If the longitudinal profiles are formed from a single length, and if convenient, the mitre shapes may be formed in a coherent length by aptly formed incisions to form inner corners at the intersection between the top and the sides.

A pane of suitable dimensions is provided, for instance as described in the above.

The sets of four inner elements and four intermediate elements are provided, for instance as described in the above.

The longitudinal profiles are now placed in an upside-down position on an assembly table to form a profile element frame structure constituting three sides of a rectangle. This typically takes place by guiding elements fixable to the assembly table corresponding to the outer circumference of the sash.

The pane is placed within the profile element frame structure, and the profile element structure is connected to the inner elements, optionally via the intermediate elements, to form the sash. During this procedure, the intermediate elements at the top and sides are typically inserted into the counterpart profile elements. The inner elements may as described above be connected to each other to form an inner element frame structure, which is placed on the pane, following which the intermediate elements are connected to the respective inner elements.

Referring briefly back to FIGS. 19 to 21, a set of two corner keys 39 is advantageously provided placed within the longitudinal profile element s 31*a*, 32*a*, 33*a* at the mutually facing mitred ends before placing the pane 4 within the profile element frame structure. Sealant 39*b* is preferably applied to each corner key 39. During assembly, it is ensured that the sealant 39*b* is able to flow through the primary openings 39*a*3 of the corner key 39 such that the sealant 39*b* is distributed.

In the embodiment shown, each corner key 39 is configured to be mechanically connected to the respective adjacent profile elements 31*a*, 32*a*, 33*a*. This may take place by clinching, for instance by TOX® technology.

In embodiments in which the roof window 1 comprises one or more glazing bars, such as glazing bar 45, the glazing bar or bars is/are aligned on the assembly table before placing the pane 4 within the profile element frame structure. The glazing bar 45 is provided with one or more adhesive strips 45*a* to fasten to the exterior surface 4*e* of the pane 4.

Sealing Assembly and Interface Unit—FIGS. 24 to 36

Referring now in particular to FIGS. 24 to 29*a*, an embodiment is shown in which the roof window 1 is provided with a covering assembly 10. Details of the covering assembly 10 generally comprising a flashing assembly and any other auxiliary equipment are described in more detail in Applicant's co-pending patent applications filed on the same date as the present application.

In the following, a sealing assembly of the roof window 1 will be described. Some details of the sealing assembly have been described in the above as well.

The sealing assembly generally comprises a set of sealing profiles.

In the embodiment shown, sealing between the sash 3 and the frame 2 is provided by an exterior sealing plane, an intermediate sealing plane and an interior sealing plane. Reference is also made to the cross-sectional views of the top, side and bottom of the roof window 1 shown and described in the above.

The interior sealing plane comprises the frame sealing profile 26*p* provided in the exterior side of each frame member 21, 22, 23, 24 and interacts with the interior side of the respective sash member 31, 32, 33, 34.

The intermediate sealing plane comprises the sash sealing profile 30*p*1 provided in the outer side of each sash member 31, 32, 33, 34 and interacts with the inner side of the respective frame member 21, 22, 23, 24. The sash sealing profile 30*p*1 is provided in sash sealing groove 30*g*1.

At the bottom side, the exterior sealing plane is provided in that the profile element sealing 34*p* on the profile element 34*a* of the bottom sash member 34 is in contact with the outer side of the bottom frame member 34 in the closed position of the sash 3.

Figure 26:
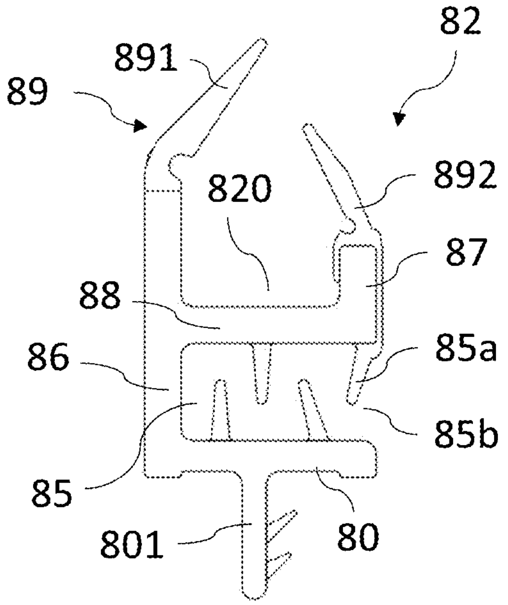
FIGS. 26 and 27 are cross-sectional views of elements of the interface unit of FIG. 25.
Figure 27:
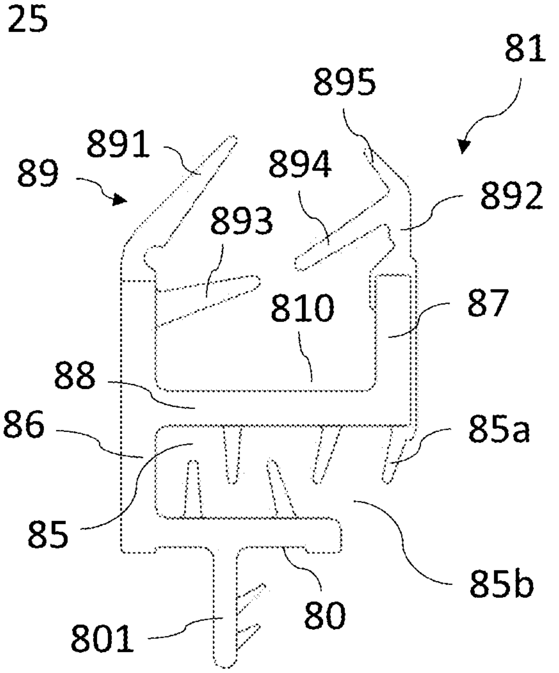

At the top and sides, the exterior sealing plane is defined by the interface elements 81, 82, 83. Referring in particular to FIGS. 26 and 27, the similarities and differences between the top interface element 81 and the side interface elements, here represented by interface element 82, in the embodiment shown will be described:

Each interface element 81, 82 comprises a base portion 80 with an anchor section 801, an inner leg 86, an outer leg 87, a flange 88 and a sealing portion 89. The anchor section 801 of the base portion 80 is received in the interface unit groove 28 in the assembled condition of the roof window 1. The sealing portion 89 faces to the exterior and interacts with the top sash member 31 and side sash members 32, 33 during opening and closing of the sash 3 and in the closed position of the sash 3.

Together, the inner leg 86, the outer leg 87, and the flange 88 form a channel 810, 820 in the top interface element 81 and the side interface element 82. A corresponding channel is formed in the other side interface element 83. In this way, water emanating from rain or other precipitation may be guided from the channel 810 in the top interface element 81 to the channels 820 in the side interface elements 82, 83 and further out to the covering assembly 10 (not shown in detail).

Common to both the top interface element 81 and the side interface element 82 in the embodiment shown is that the sealing portion 89 comprises an inner sealing lip 891 and an outer sealing lip 892. The inner sealing lip 891 of both the top interface element 81 and of the side interface element 82 is provided sufficiently inwards that the inner sealing lip 891 interacts with the interior of the top sash member 31 and the side sash member 32, cf. FIGS. 6 and 5; however the outer sealing lip 892 of the top interface element 81 is located on the outer side of the top sash member 31. In the embodiment shown, this is due to the fact that the flange 88 of the top interface element 81 is longer than the counterpart flange of the side interface element 82. It is noted that while at least the sealing portion 89 of each interface element 81, 82, 83 is formed to be resilient, i.e. as is customary in sealings, the sealing portion 89 is able to be deformed when coming into abutment with another component and then spring back when relaxing, this is not reflected in the figures since they generally show elements in their undeformed condition. In general, at least the sealing portion 89 has different properties than at least the base portion 80. This may be provided by co-extrusion or co-moulding of two (or more) different materials.

Figure 28:
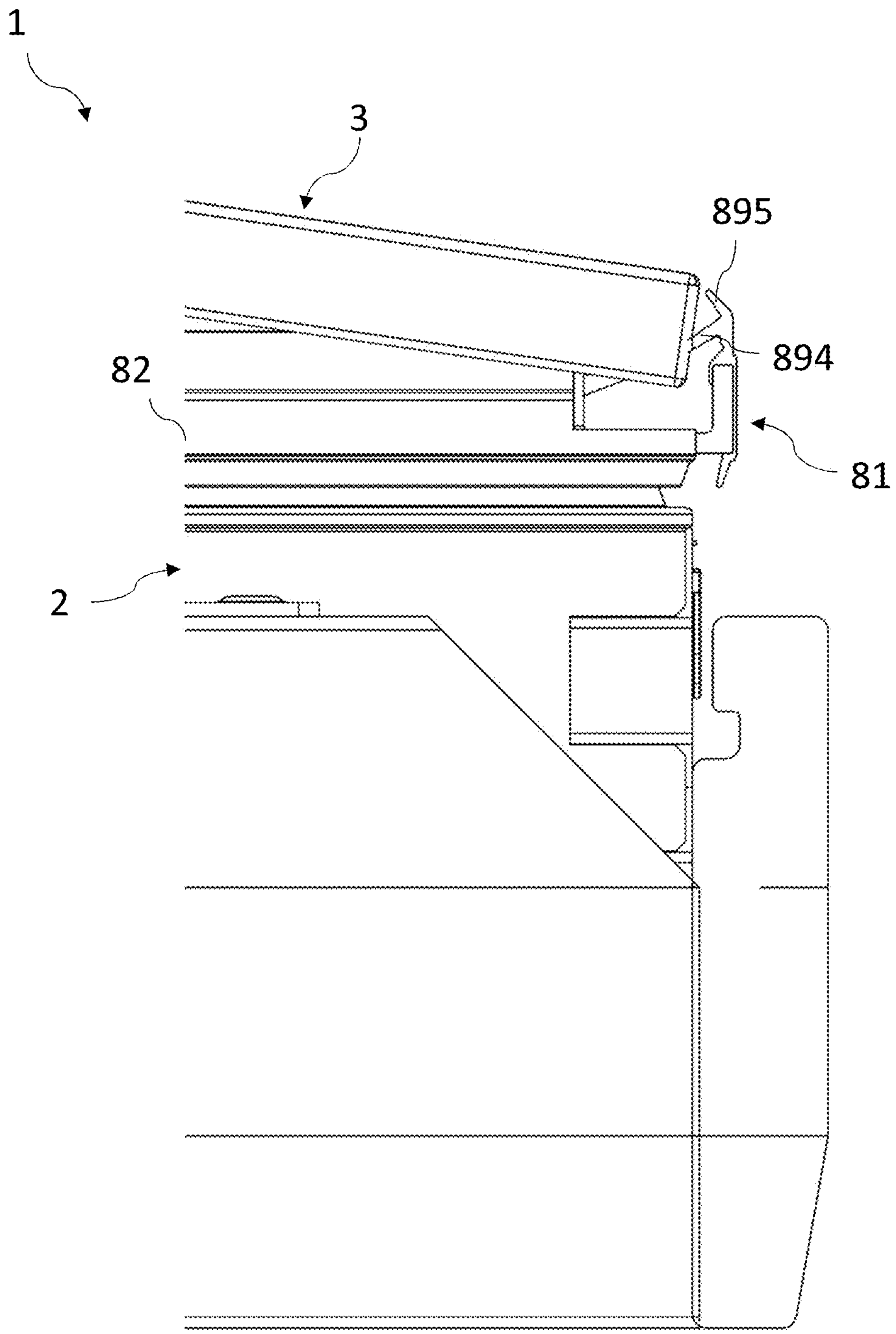
FIG. 28 is a partial side view of a roof window in the open position shown in FIG. 7, showing the interaction between the sash and the interface unit of FIG. 25.

To ensure a tight interaction at the top of the roof window 1, the top interface element 81 comprises an additional inner sealing lip 893, a first additional outer sealing lip 894 and a second additional outer sealing lip 895, cf. also FIG. 28.

In the embodiment shown, the interface elements 81, 82, 83 furthermore allow interaction with the covering assembly 10 in that the base portion 80, inner leg 86 and flange 88 form a flashing reception groove 85. The flashing reception groove 85 has a groove opening 85*b* and is provided with a number of protrusions 85*a*.

The sealing assembly furthermore comprises a pane sealing 30*p*2, received in pane sealing groove 30*g*2. It is noted that the pane sealing 30*p*2 remains stationary relative to the sash 3.

Referring now to FIGS. 29*b* to 36, details of alternative embodiments will be described. Only differences relative to the above-mentioned embodiment will be described in detail.

Figure 29A:
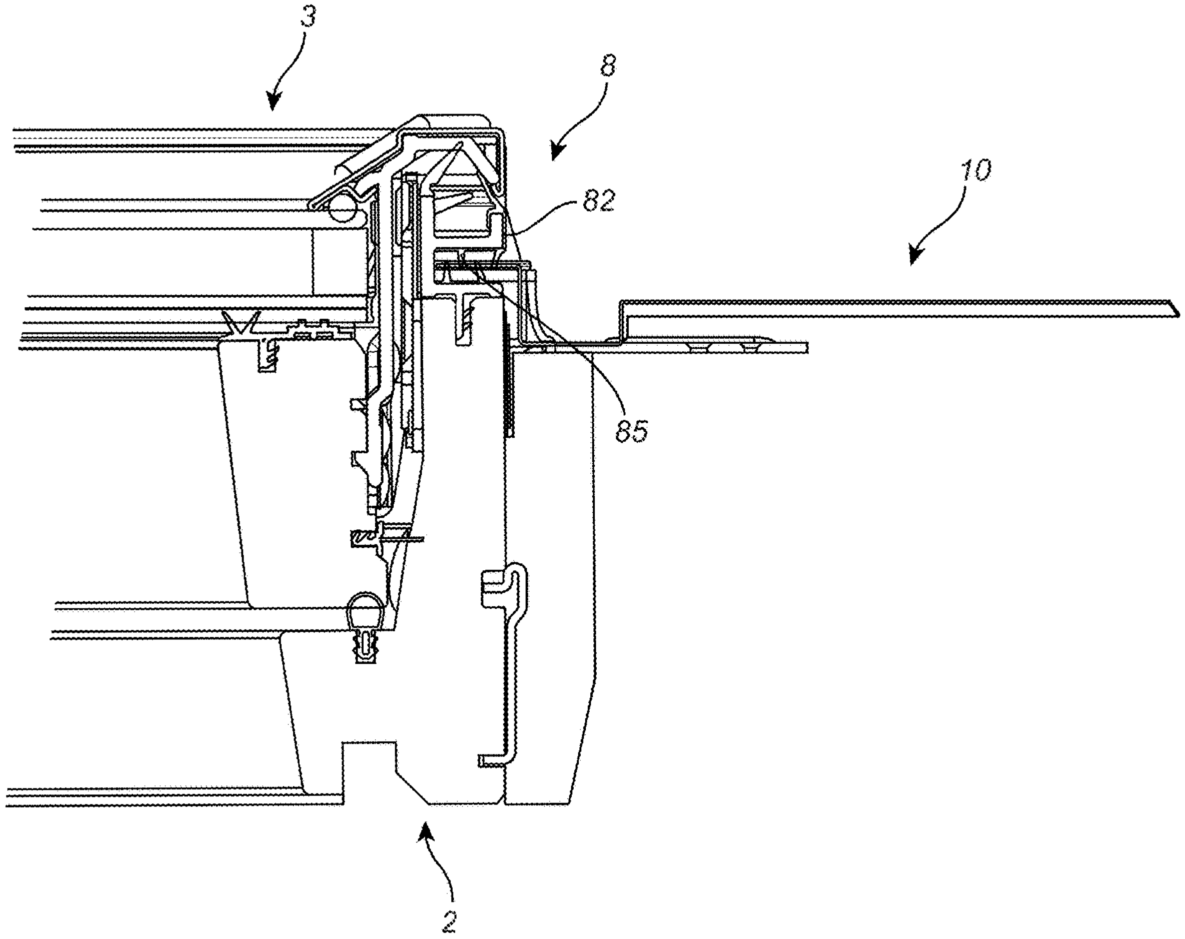
FIG. 29*a* is a cross-sectional view along the line XXIX-XXIX in FIG. 24.
Figure 29B:
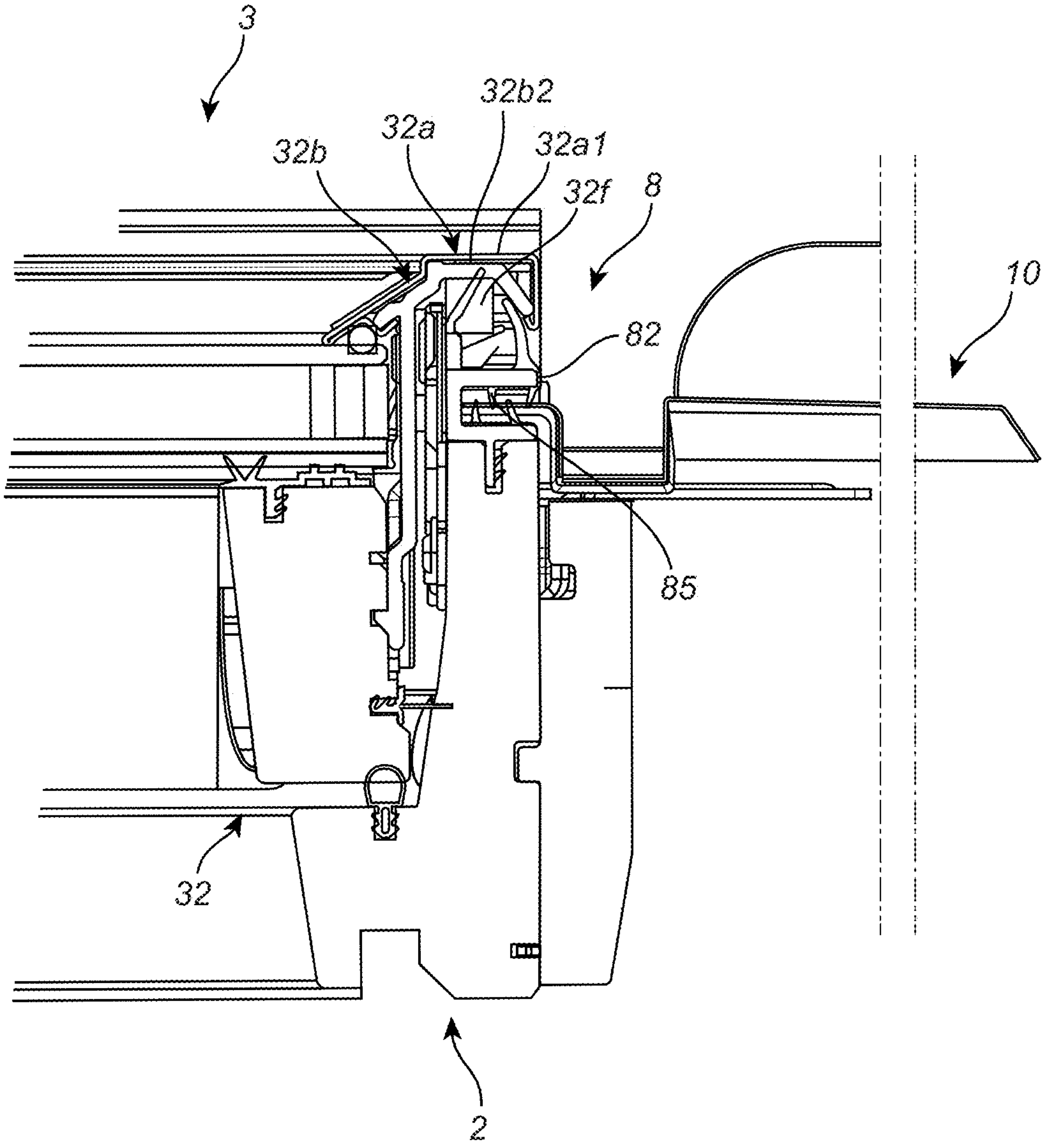
FIG. 29*b* is a view corresponding to FIG. 29*a*, of an alternative embodiment of the general embodiment of FIG. 24.

In FIG. 29*b*, a foam element 32*f* is shown present in the sash side member 32. A similar foam element may be present in the opposite sash side member 33 as well. The longitudinal extension of the foam element 32*f* may be such that the foam element 32*f* extends over a major part of the length of the sash side member 32. The foam element 32*f* abuts the interior side of the head portion 32*b*2 of the intermediate element 32*b* along the extent of the intermediate element 32*b*, and is allowed to expand towards the interior side of the head portion 32*a*1 of the profile element 32*a* of the side sash member 32 in the portions of the foam element 32*f* protruding beyond the longitudinal ends of the intermediate element 32*b*. The foam element 32*f* has general climate shielding properties.

Figure 30:
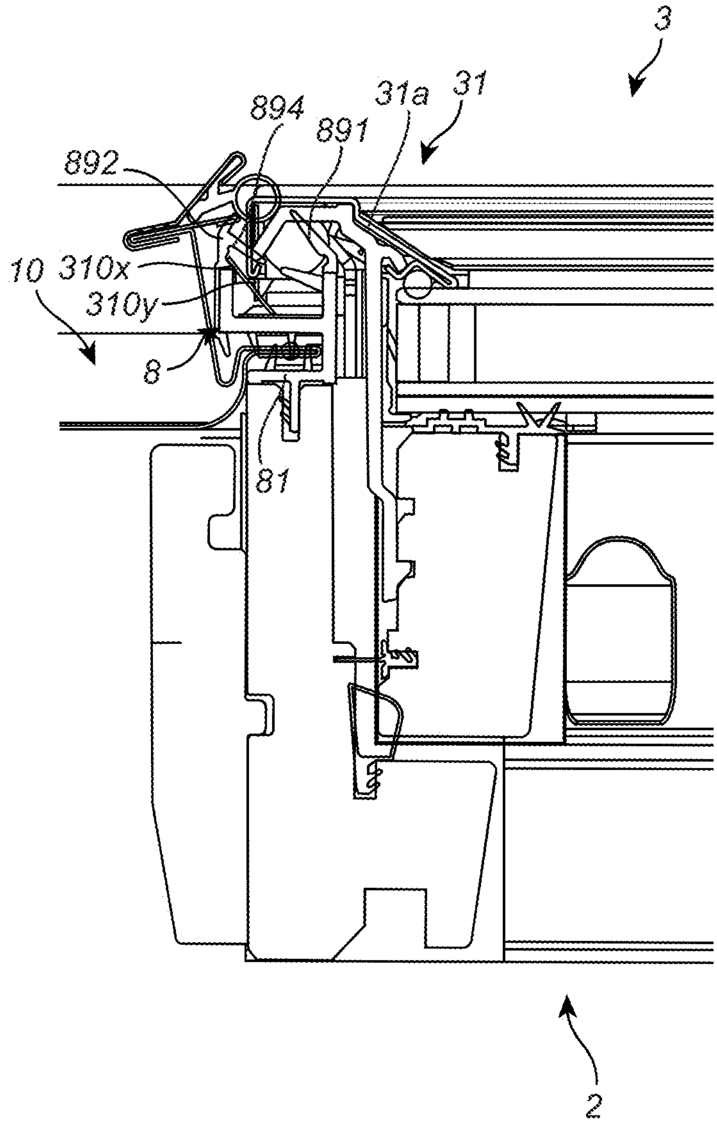
FIG. 30 is a cross-sectional view of an alternative embodiment, corresponding to a cross-sectional view along the line XXX-XXX of the general embodiment of FIG. 24.
Figure 33:
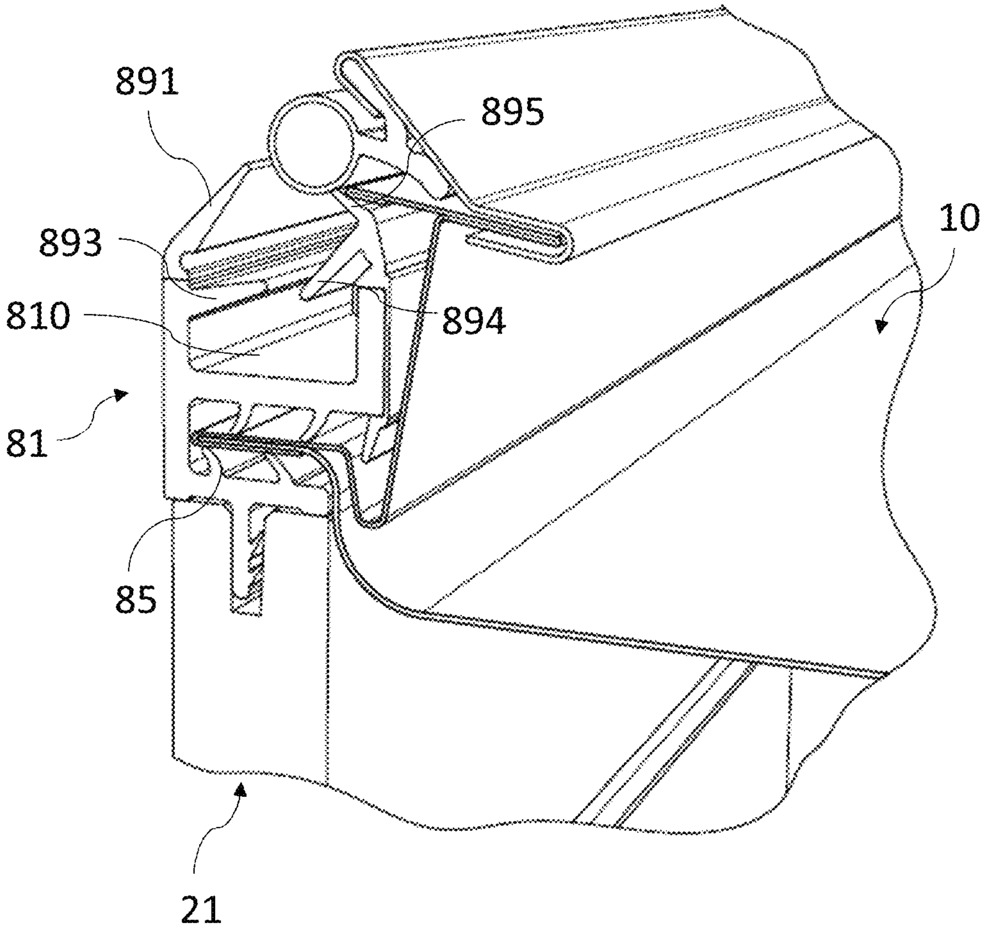
FIG. 33 is a partial sectional view of the top right-hand corner of an embodiment of the roof window according to the invention.

In FIG. 30, a stabilising plate 310*x* is placed in the channel 810 of the top element 81 of the interface unit 8 to improve the structural properties. Furthermore, an extension plate 310*y* is shown fastened to the profile element 31*a* of the top sash member 31 to protrude into the channel 810. The extension plate 310*y* improves guidance of precipitation into the channel 810 and for further guidance towards the sides of the roof window. This is particularly relevant in roof windows built into roofs of a large inclination. The relative positions of the stabilising plate 310*x* and the extension plate 310*y* are shown more clearly in FIG. 32. For ease of reading of the relevant portions of the interface unit 8, FIG. 33 shows the top element 81 of the interface unit 8 without the stabilising plate 310*x* and without the sash 3 including the extension plate 310*y*.

Figure 31:
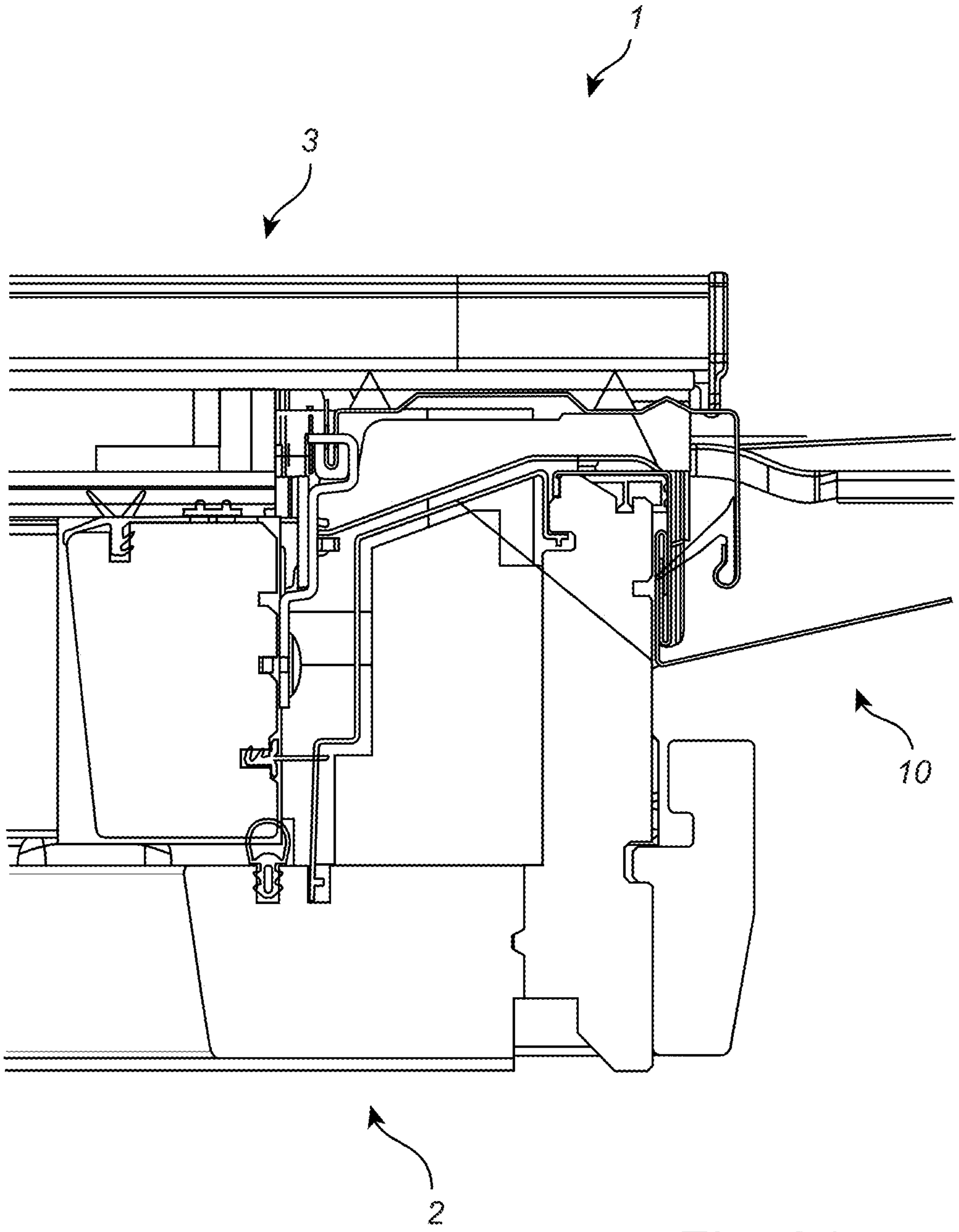
FIG. 31 is a cross-sectional view of an alternative embodiment, corresponding to a cross-sectional view along the line XXXI-XXXI of the general embodiment of FIG. 24.
Figure 32:
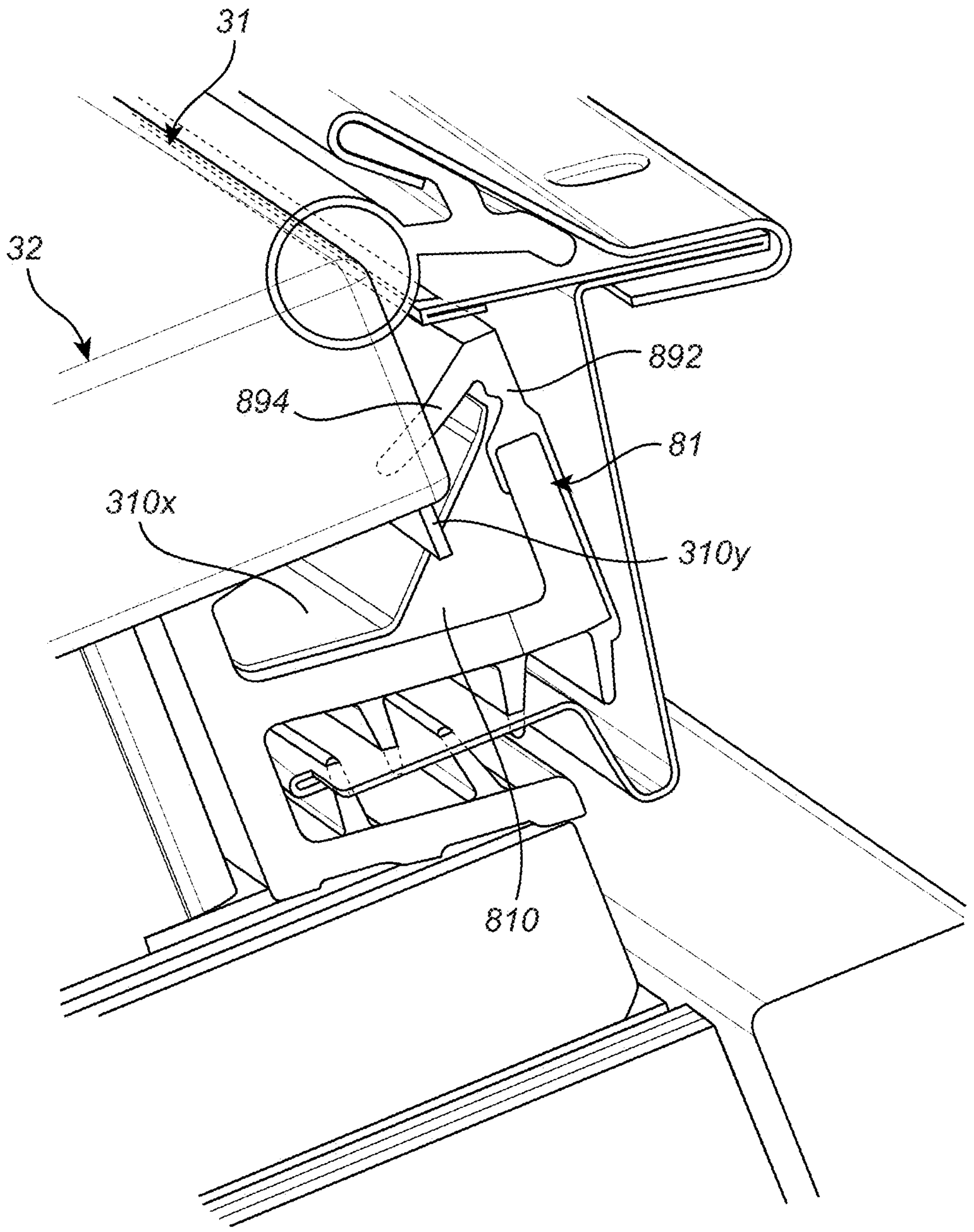
FIG. 32 is a partial perspective view of the top right-hand corner of the alternative embodiment of the roof window.

FIG. 31 shows the interaction between the bottom of the roof window 1 and the covering assembly 10.

Figure 34:
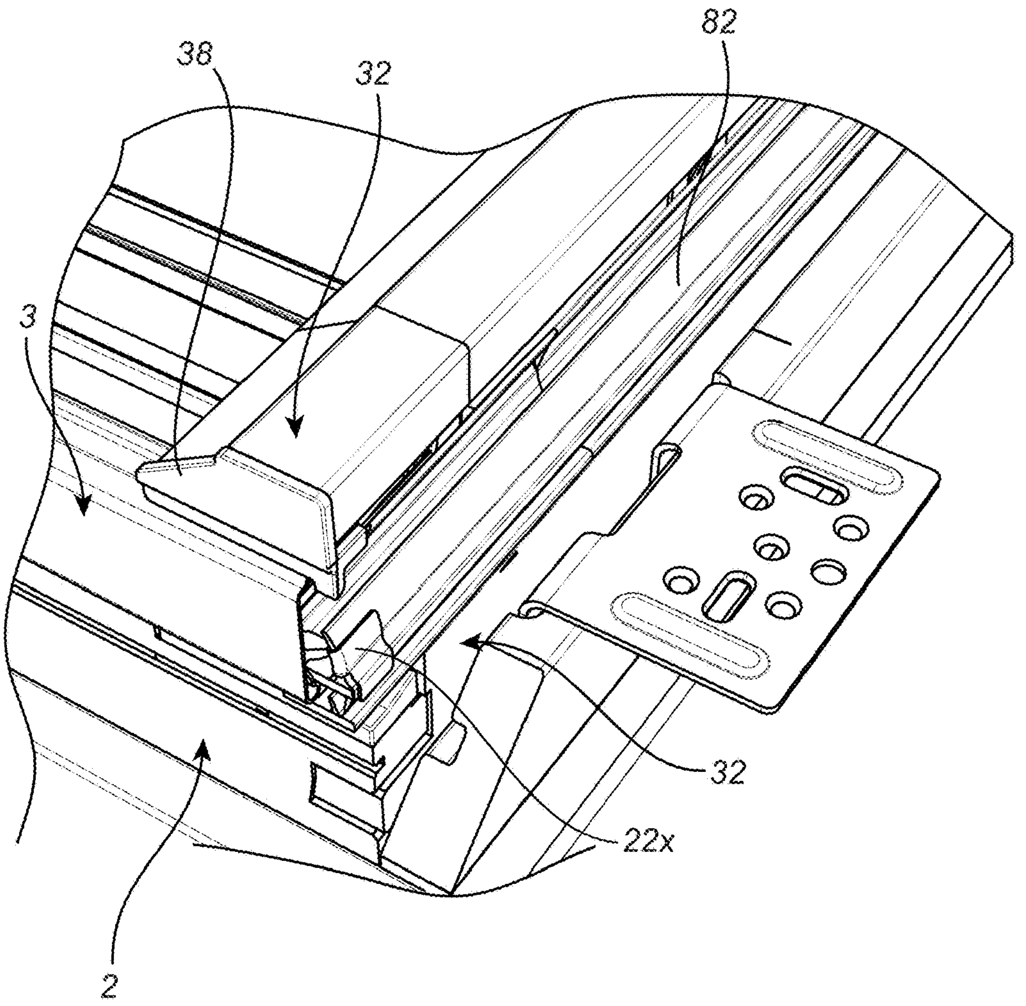
FIG. 34 is a partial perspective view of the bottom right-hand corner of the alternative embodiment of the roof window.
Figure 35:
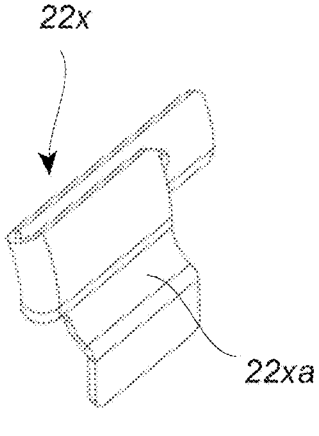
FIG. 35 is a perspective view, on a larger scale, of a detail of the embodiment of FIG. 34.
Figure 36:
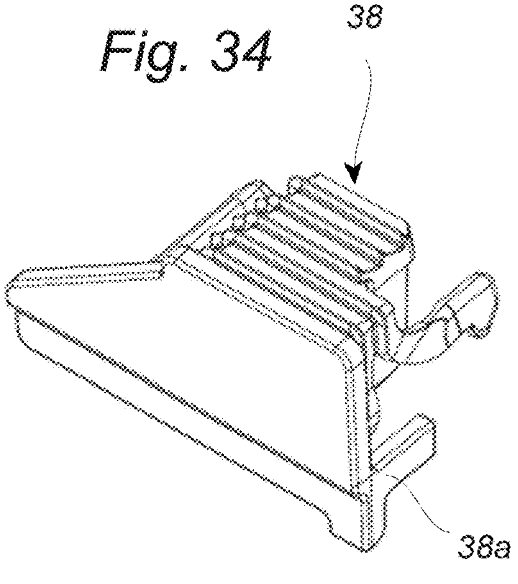
FIG. 36 is a perspective view, on a larger scale, of a further detail of the embodiment of FIG. 34.

Finally, FIG. 34 show a view of the lower right-hand corner of the roof window 1, in which the sash 3 has been lifted slightly relative to the frame 2 for clarity reasons.

Here, a clip 22*x* is mounted on the side element 82 of the interface unit 8. The clip 22*x* is provided with a clip flange 22*xa* as shown in more detail in FIG. 36. The end plug 38 of the sash side member 32 is in this embodiment provided with an end plug flange 38*a*. In the closed position of the roof window 1, the end plug flange 38*a* overlaps the clip flange 22*xa*.

In general, components of the roof window are easily disassembled and each component may in principle be reused, be recycled by appropriate environmentally responsible disposal means, or the material be recovered for other uses.

LIST OF REFERENCE NUMERALS

- 1 roof window
- 2 frame
  - 21 top frame member
  - 21*i* inwards protruding portion
  - 22 side frame member
  - 22*c* adapted side frame member
  - 22*i* inwards protruding portion
  - 22*s* abutment element
  - 22*x* clip
  - 22*xa* clip flange
  - 23 side frame member
  - 24 bottom frame member
  - 24*a* outer piece of bottom frame member
  - 24*a*1 receiving groove
  - 24*b* separate inner piece of bottom frame member
  - 24*b*1 receiving groove
  - 24*c* cover
  - 24*c*1 edge portion
  - 24*c*2 edge portion
  - 24*d* insulating piece
  - 24*i* inwards protruding portion
  - 25 lining groove
  - 25*a* first groove portion
  - 25*b* second groove portion
  - 26 sealing groove
  - 26*p* frame sealing profile
  - 27 first outer groove
  - 27*b* second outer groove
  - 28 interface unit groove
  - 29*a* hinge assembly receiving milling
  - 29*b* hinge assembly receiving milling
  - 29*c* opening
  - 29*d* opening
  - 29*e* through-going opening
  - 29*f* opening
- 3 sash
  - 30*g*1 sash sealing groove
  - 30*p*1 sash sealing profile
  - 30*g*2 pane sealing groove
  - 30*p*2 pane sealing
  - 30*x* fastening means

30*y* fastening means
31 top sash member
31*a* profile element of top sash member
31*b* intermediate element
31*c* inner element
310*x* stabilising plate
310*y* extension plate
32 side sash member
32*a* profile element of side sash member
32*a*1 head portion
32*a*2 inner portion
32*a*3 outer portion
32*a*4 first bend
32*a*5 second bend
32*a*6 third bend
32*a*7 transition portion
32*a*8 fourth bend
32*b* intermediate element
32*b*1 base portion
32*b*2 head portion
32*b*3 engagement means/protruding portion/flange
32*b*4 stepped section
32*b*5 offsetting bend
32*b*6 opening
32*b*7 ridge portion
32*b*8 inner inclined portion
32*b*9 inner edge portion
32*b*10 bend
32*b*11 outer inclined portion
32*b*12 outer edge portion
32*c* inner element
32*c*1 reception means/first groove
32*c*2 reception means/second groove
32*f* foam element
32*s* screening mounting bracket
33 side sash member
33*a* profile element of side sash member
33*b* intermediate element
33*c* inner element
34 bottom sash member
34*a* profile element of bottom sash member
34*a*1 head portion
34*a*2 inner portion
34*a*3 outer portion
34*a*4 groove in head portion 34*a*1
34*a*5 slit in inner portion 34*a*2
34*b* intermediate element
34*b*0 first fitting part of connecting fitting
34*b*1 base portion
34*b*2 head portion
34*b*3 engagement means/protruding portion
34*b*4 stepped section
34*b*5 offsetting bend
34*b*6 opening
34*b*10 second fitting part of connecting fitting
34*b*11 resilient hook
34*c* inner element
34*c*1 reception means/first groove
34*c*2 reception means/second groove
34*p* profile element sealing
37 trailing element
38 end plug
38*a* end plug flange
39 corner key
39*a*1 leg
39*a*2 channel
39*a*3 primary opening
39*a*4 depending skirt
39*a*5 secondary opening
39*a*6 inclined section
39*a*7 tongue
39*a*8 inclined channel section
39*b* sealant
4 pane
41 exterior sheet
41*a* extended portion
41*b* bottom edge portion of exterior sheet
42 interior sheet
42*b* bottom edge portion of interior sheet(s)
43 additional interior sheet
44 masking
45 glazing bar
45*a* adhesive strip
46 glazing bar cover element
47 spacer
4*b* side edge portion of pane
4*c* top edge portion of pane
4*e* exterior surface of pane
4*i* interior surface of pane
4*p* sealing (pane)
4*s* sealing strip (pane)
4*t* pane clip
5 operating assembly
51 socket fitting
511 base plate of socket fitting
512 flanges of socket fitting
513 holes
52 spindle part
521 spindle
522 handle
53 nut part
531 nut ring
532 bolts
54 end portion
55 sash fitting
551 base plate of sash fitting
552 flanges of sash fitting
553 openings
56 split
6 mounting bracket
61 first bracket leg
614 bend
62 second bracket leg
620 aperture
621 first section
624 first engagement means/flange
625 hinge connection
626 second section
629 second engagement means/flange
7 insulating frame
71 top piece of insulating frame
72 side piece of insulating frame
73 side piece of insulating frame
74 bottom piece of insulating frame
75 indentation
76 recess
77 folding line
78 protrusion
8 interface unit
80 base portion
801 anchor section
81 top element of interface unit
810 channel in top interface element
82 side element of interface unit

820 channel in side interface element
83 side element of interface unit
84 bottom element of interface unit
85 flashing reception groove
85*a* protrusions
85*b* groove opening
86 inner leg
87 outer leg
88 flange
89 sealing portion
891 inner sealing lip
892 outer sealing lip
893 additional inner sealing lip
894 first additional outer sealing lip
895 second additional outer sealing lip
9 hinge assembly
91 hinge unit
92 frame hinge part
93 sash hinge part
94 hinge pin
95 coupling unit
96 top frame coupling plate
961 base section
961*c* spigot
962 bolt/engagement pin
963 bolt/engagement pin
97 side frame coupling plate
971 base section
971*e* spigot
981 screw
982 insert nut
983 insert nut
10 covering assembly

The invention claimed is:

1. A roof window comprising a frame, a sash, and a pane, in which the frame comprises a set of frame members including a top frame member, two side frame members and a bottom frame member and the sash comprises a set of sash members including a top sash member, two side sash members and a bottom sash member, the roof window furthermore comprising a plurality of mounting brackets and an insulating frame, wherein each frame member comprises a plurality of receiving structures at an interior, exterior, inner and/or outer side of the respective frame member, each said receiving structure being configured to interact with auxiliary equipment in an assembled condition of the frame, that a first receiving structure comprises a first outer groove in an outer side of one frame member of the set of frame members, that said first outer groove is configured to interact with a protrusion on a piece of the insulating frame, that a second receiving structure comprises a second outer groove in an outer side of at least the side frame members, configured to interact with engagement means of a mounting bracket, and that the engagement means of the mounting bracket engage with the second outer groove and engage with the first outer groove, wherein (i) the first outer groove is spaced from the second outer groove in a height direction of the roof window.

2. The roof window according to claim 1, wherein at least the top frame member and the two side frame members have substantially identical cross-sections.

3. The roof window according to claim 2, wherein the bottom frame member comprises an outer piece and a separate inner piece.

4. The roof window according to claim 2, wherein a third receiving structure comprises a lining groove in an interior side of each frame member of the set of frame members, the lining grooves being configured to interact with a set of interior lining panels.

5. The roof window according to claim 2, wherein the sash is connected to the frame by means of a hinge assembly to provide a tophung hinge connection during normal use.

6. The roof window according to claim 1, wherein the bottom frame member comprises an outer piece and a separate inner piece.

7. The roof window according to claim 6, wherein a third receiving structure comprises a lining groove in an interior side of each frame member of the set of frame members, the lining grooves being configured to interact with a set of interior lining panels.

8. The roof window according to claim 6, wherein the sash is connected to the frame by means of a hinge assembly to provide a tophung hinge connection during normal use.

9. The roof window according to claim 1, wherein a third receiving structure comprises a lining groove in an interior side of each frame member of the set of frame members, the lining grooves being configured to interact with a set of interior lining panels.

10. The roof window according to claim 9, wherein a first groove portion is provided in an outer piece of the bottom frame member and a second groove portion is provided in a separate inner piece of the bottom frame member, the first and second groove portions forming said lining groove in the assembled condition of the frame.

11. The roof window according to claim 1, wherein the sash is connected to the frame by means of a hinge assembly to provide a tophung hinge connection during normal use.

12. The roof window according to claim 11, wherein each frame member of the set of frame members comprises an inwards protruding portion at least partly overlapping the corresponding sash member of the set of sash members, as seen from the interior.

13. The roof window according to claim 12, wherein a fourth receiving structure comprises a sealing groove in an exterior side of the inwards protruding portion, said sealing groove being configured to interact with a sealing profile.

14. The roof window according to claim 13, wherein the inwards protruding portion of each frame member of the set of frame members has an inwards facing surface configured to form a coherent inwards facing surface in the mounted condition of the frame mimicking a corresponding coherent inwards facing surface of the sash.

15. The roof window according to claim 12, wherein the inwards protruding portion of each frame member of the set of frame members has an inwards facing surface configured to form a coherent inwards facing surface in the mounted condition of the frame.

16. The roof window according to claim 15, the coherent inwards facing surface in the mounted condition of the frame mimics a corresponding coherent inwards facing surface of the sash.

17. The roof window according to claim 12, wherein a fifth receiving structure comprises an interface unit groove in an exterior side of the top frame member and the two side frame members, configured to interact with a respective top and side element of an interface unit.

18. The roof window according to claim 1, wherein a sixth receiving structure comprises a hinge assembly receiving milling in an inner side of the top frame member of the frame, configured to cooperate with a top frame coupling plate of a coupling unit of a hinge assembly.

19. The roof window according to claim 18, the sixth receiving structure further comprises a hinge assembly receiving milling in the two side frame members to cooperate with a side frame coupling plate of a coupling unit of a hinge assembly.

20. The roof window according to claim 1, wherein that said first outer groove is further configured to interact with the engagement means of the mounting bracket.

* * * * *